United States Patent [19]

Wakeland et al.

[11] Patent Number: 5,220,410
[45] Date of Patent: Jun. 15, 1993

[54] METHOD AND APPARAUS FOR DECODING ENCODED VIDEO DATA

[75] Inventors: Carl K. Wakeland, Bedford; Dale Chatham, Azle, both of Tex.

[73] Assignee: Tandy Corporation, Fort Worth, Tex.

[21] Appl. No.: 771,310

[22] Filed: Oct. 2, 1991

[51] Int. Cl.$^5$ .......................................... H04N 11/04
[52] U.S. Cl. ...................................... 358/13; 358/135
[58] Field of Search ................. 358/13, 135, 136, 138, 358/21 R, 12

[56] References Cited

U.S. PATENT DOCUMENTS

| 4,216,453 | 12/1987 | Pawelski | 358/133 X |
| 4,672,427 | 6/1987 | Rzeszewski | 358/11 |
| 4,847,677 | 7/1989 | Music et al. | 358/135 X |
| 4,857,992 | 8/1989 | Richards | 358/135 X |

Primary Examiner—Victor R. Kostak
Attorney, Agent, or Firm—David L. McCombs; Michael S. Bush; Keith Hargrove

[57] ABSTRACT

Method and apparatus within a multimedia system for digitally decoding video pixel data. The pixel data is decoded to 24 bits per pixel from a compressed 8 bits per pixel format. The compressed pixel data is deformatted into its separate luminance and chrominance components. The components are then differentially expanded and assigned to associated pixel elements. Predominant color transitions are designated to determine the pixel location where the chrominance components change. An interpolated chrominance component may be inserted at these color change locations to smooth out the color transitions.

29 Claims, 14 Drawing Sheets

| BYTE 1 | | | | | | | |
|---|---|---|---|---|---|---|---|
| 7 | 6 | 5 | 4 | 3 | 2 | 1 | 0  BIT POS |
| TRANS CODE BIT 0 | U4 PEL #1-4 | U3 PEL #1-4 | Y4 PEL #1 | Y3 PEL #1 | Y2 PEL #1 | Y1 PEL #1 | Y0 PEL #1 |

| BYTE 2 | | | | | | | |
|---|---|---|---|---|---|---|---|
| 7 | 6 | 5 | 4 | 3 | 2 | 1 | 0  BIT POS |
| U2 PEL #1-4 | U1 PEL #1-4 | U0 PEL #1-4 | Y4 PEL #2 | Y3 PEL #2 | Y2 PEL #2 | Y1 PEL #2 | Y0 PEL #2 |

| BYTE 3 | | | | | | | |
|---|---|---|---|---|---|---|---|
| 7 | 6 | 5 | 4 | 3 | 2 | 1 | 0  BIT POS |
| TRANS CODE BIT 1 | V4 PEL #1-4 | V3 PEL #1-4 | Y4 PEL #3 | Y3 PEL #3 | Y2 PEL #3 | Y1 PEL #3 | Y0 PEL #3 |

| BYTE 4 | | | | | | | |
|---|---|---|---|---|---|---|---|
| 7 | 6 | 5 | 4 | 3 | 2 | 1 | 0  BIT POS |
| V2 PEL #1-4 | V1 PEL #1-4 | V0 PEL #1-4 | Y4 PEL #4 | Y3 PEL #4 | Y2 PEL #4 | Y1 PEL #4 | Y0 PEL #4 |

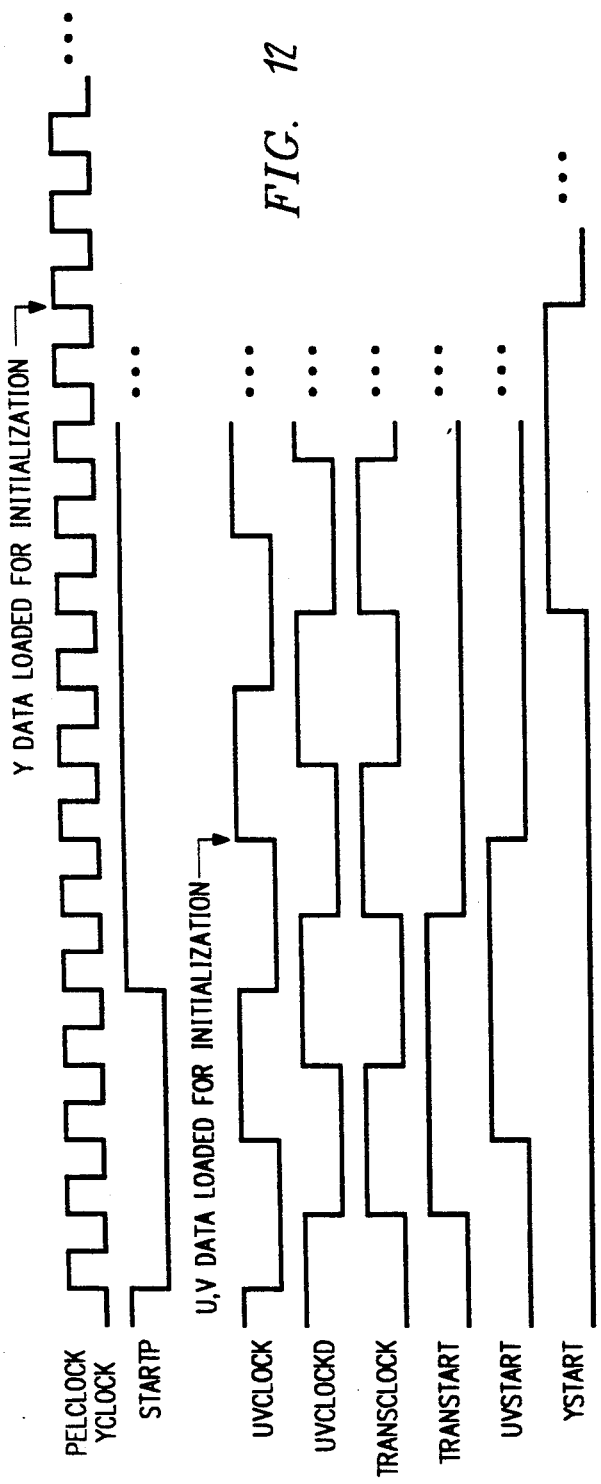
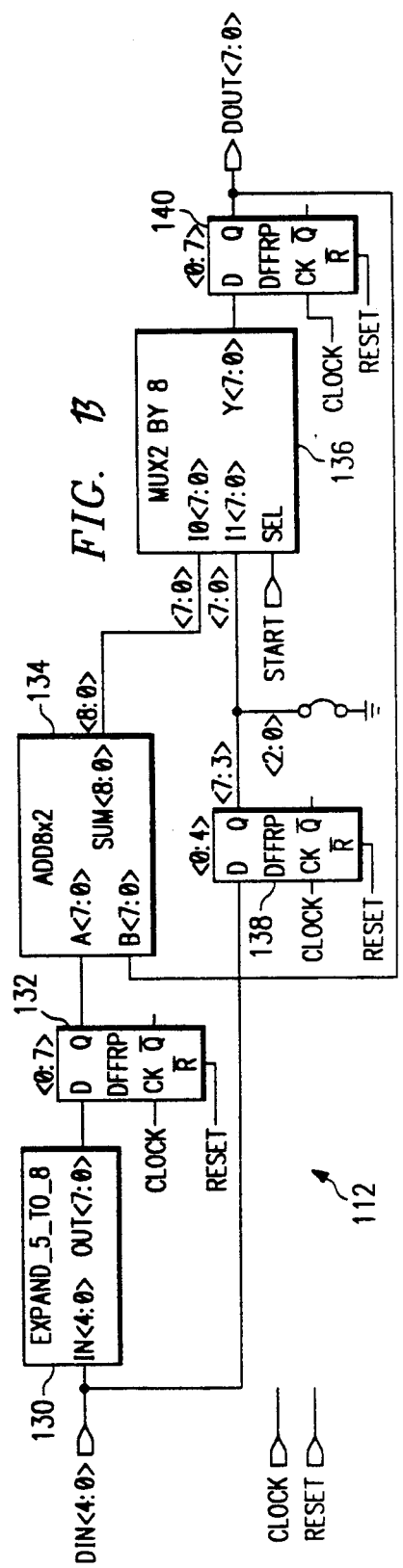
FIG. 12
FIG. 13

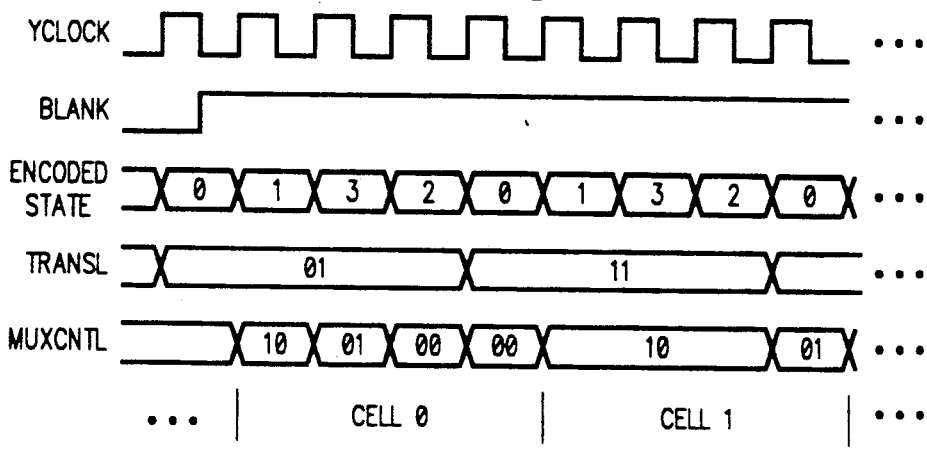
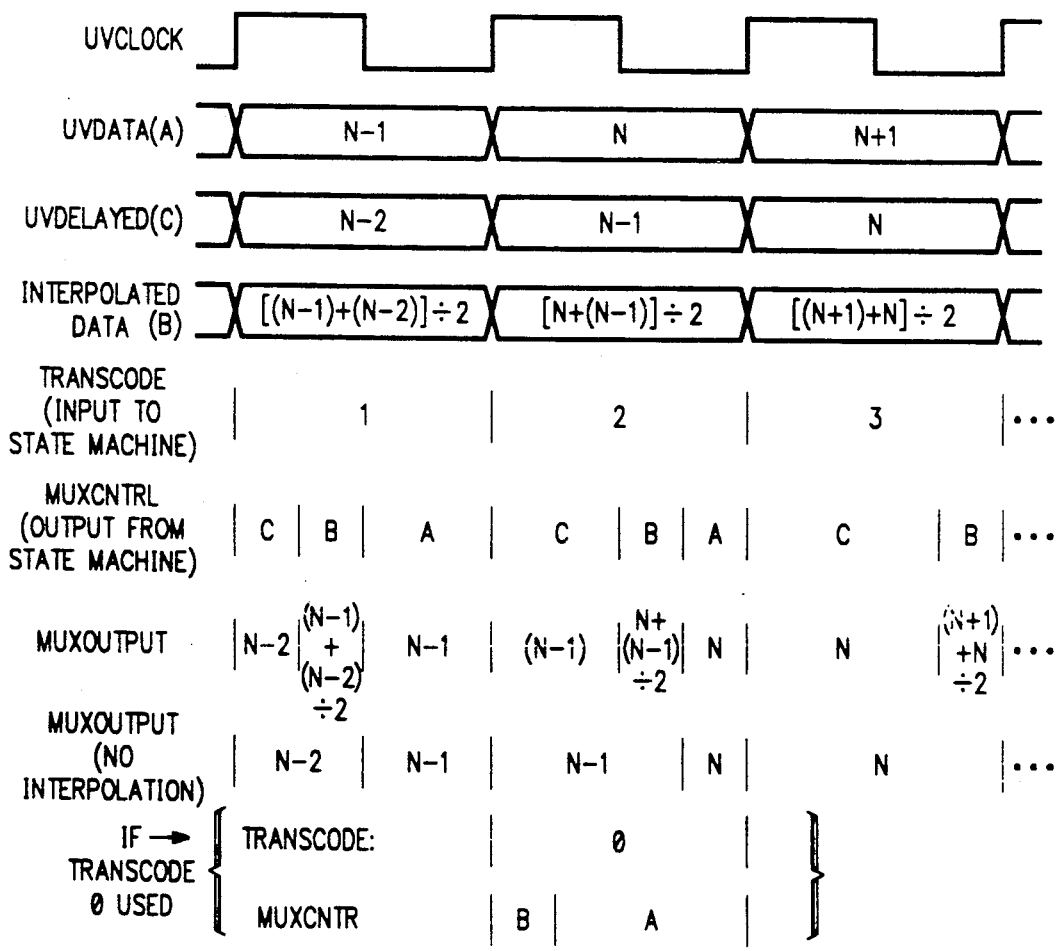

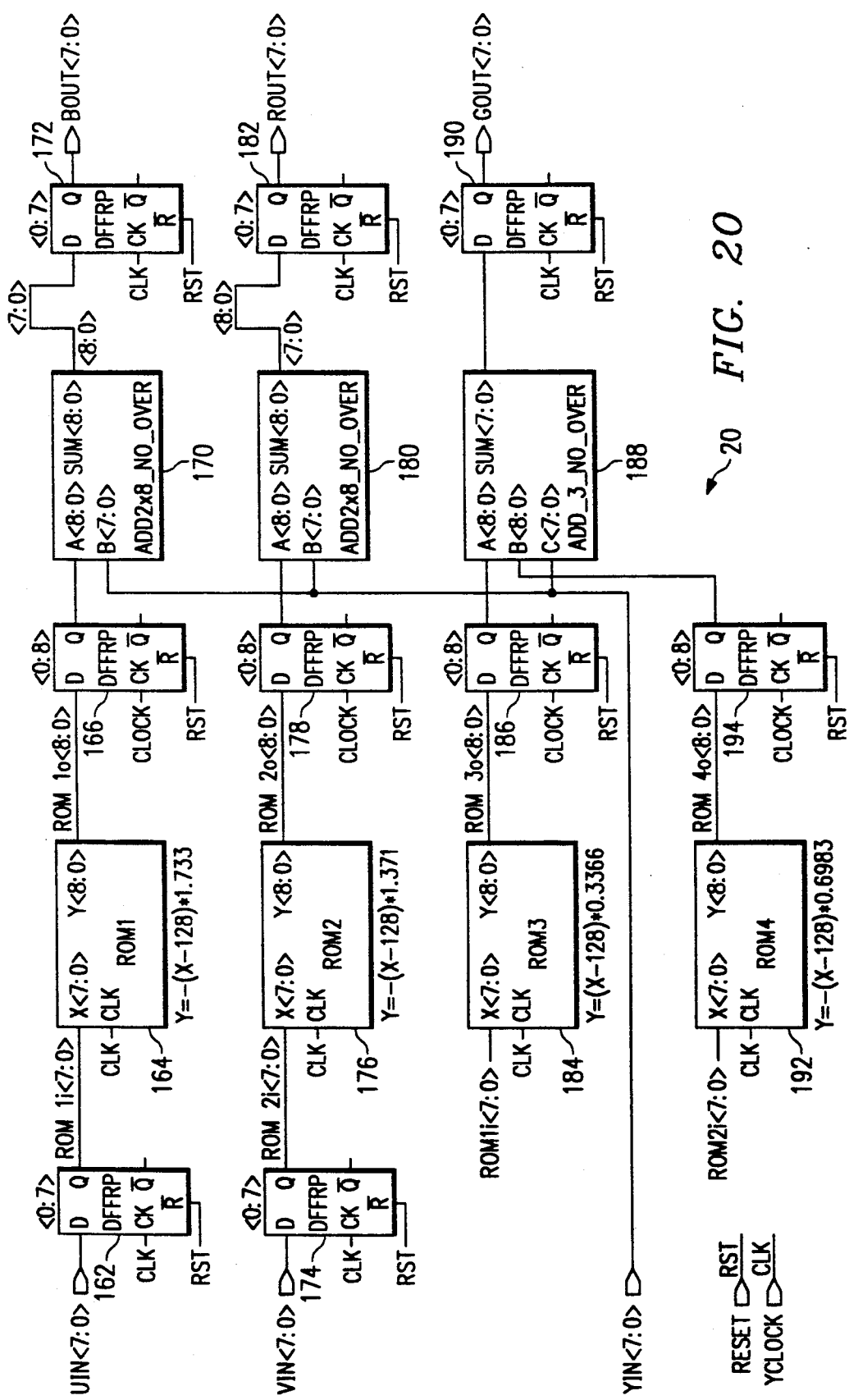

METHOD AND APPARAUS FOR DECODING ENCODED VIDEO DATA

CROSS REFERENCE TO RELATED APPLICATION

This application is related to co-pending U.S. Pat. application Ser. No. 07/770,544 entitled METHOD AND APPARATUS FOR ENCODING VIDEO COLOR DATA SIGNALS AND PROTOCOL FOR ENCODING SAME, filed on even date herewith, assigned to the assignee of the present application and hereby incorporated by reference as if reproduced in its entirety.

BACKGROUND OF THE INVENTION

1. Field of the Invention

This invention is related to video signal processing techniques and, more particularly, to a method and apparatus for decoding differentially encoded video color data signals.

2. Description of Related Art

The capability of displaying full-color, 32-bit images on high-resolution monitors has, in recent years, become increasingly in demand, particularly in multimedia and scientific visualization applications. However, full-color, 32-bit images require enormous amounts of storage space which, in turn, increases the cost of such imaging systems considerably. For example, a single full-color, 32-bit image on a high resolution display can often require as much as 3–4 Mbytes of data. In contrast, a single gray-scale image typically requires 1 Mbytes of data and a single black-and-white image typically requires only 125 Kbytes of data. These storage requirements are particularly problematic in animated graphic and/or full motion video applications. Animated graphic applications require the storage and display of hundreds of screen images in sequence. Full-motion color video applications, on the other hand, requires the display of 30 frames, each demanding approximately 1 Mbyte of storage space, per second. Thus, one minute of full motion color video will require a storage capacity of almost 2 Gigabytes.

Even assuming that sufficient storage capacity is available, data transfer rates pose yet another obstacle to widespread use of full color video imaging systems. Most desktop computers fall well short of the 30 Mbps data transfer rate required for full-motion color video applications. For example, the hard disk drives commonly found in many desktop computers have data transfer rates of 1 to 2 MBps. Furthermore, the data buses most commonly associated with such computer systems also tend to transfer data at rates under 20 MBps. For example, the AT bus drive runs at 8 MBps. The CD has long been viewed as the solution to the storage requirements for full-motion color video applications. CD-ROM drives, however, tend to transfer data at rates slower than hard disk drives. Thus, while the much larger storage space of the CD is capable of addressing one problem with full-motion color video applications, the relatively slow CD-ROM drive remains an obstacle.

The solution to these problems is the use of data compression to reduce the size of the data required to represent a graphic image. In the past, data compression has been widely used for archiving and transmitting text files and various data compression algorithms have been designed for this purpose. The use of compression techniques for image data, on the other hand, has been less frequent. For compressing either text or image data file, the principal is the same—reduce the data to an abbreviated or shorthand form that retains the basic information contained in the file. Often, data compression involves identifying redundant or unnecessary information and substituting an abbreviation or shorthand symbol for that information.

The basic component of an image is the pixel and most image compression techniques address the visual attributes (color and transparency) attached to each pixel of an image. Because images generally have regions of uniform color or pattern, most commonly in the background, it is possible to represent the visual attributes of these regions using much less data information than that required to separately represent each individual pixel in that region. For this reason, many image compression schemes are directed towards dividing an image into various regions for individually encoding the visual attributes of the regions. For example, in U.S. Pat. No. 4,785,349 to Keith et al., each image is divided into a plurality of coded regions, each being encoded by a region descriptive code conveying data representative of the size and location of the regions within the image and a region fill code conveying pixel amplitude information for the regions. The region descriptive codes and fill codes are grouped together according to type and are variable length encoded according to their statistical distributions in a data stream. Separate variable length decoding of individual segments of the data stream is performed by multiple variable length decoders responsive to statistical information in the stream. Similarly, U.S. Pat. No. 4,868,653 to Golin et al. divides a frame of a digital video signal into a plurality of regions, each of which is separately analyzed and encoded by a selected one of several compression procedures to provide an optimum coding specific to the characteristics of the region 15 being coded.

It has often been recognized that, in generating a high quality image, certain components of the data information for the image are less important than the data information of other components of the image. One way that this concept has been exploited has been to add additional information to full color video signals. For example, U.S. Pat. No. 5,300,377 to Lipmann et al. discloses an extended definition television system which generated chrominance data information at a fraction of the frame rate and using the additional channel space for encoded additional luminance data information. Similarly, many image compression schemes are also based upon the concept that, in maintaining a high quality image, certain types of data information is less important than other types of data information. In an extreme case, it is sometimes possible to discard portions of the data information altogether when compressing an image without negatively impacting the quality of the image. For example, some of the data information may be related to a portion of the image not visible to the human eye and may, therefore, be readily discarded. In other, less extreme cases, image compression schemes selectively compress various components of the image. For example, U.S. Pat. No. 4,953,196 to Ishikawa et al. discloses a compression method used for transmitting color video images over phone lines. Here, a digital RGB signal is converted into a luminance (or "Y") signal and a pair of color difference signals referred to as "I" and "Q" signals. Differential pulse code modulation (or "DPCM") is used to compress and encode the Y signal and, taking into account the visual characteristics of the I and Q signals, the color difference signals are thinned out by selectively discarding certain color difference signals.

Another data information compression scheme utilizes a 4:2:2 YUV compression ratio during the encoding process. The Y (or "luminance") signal is encoded in 8 bits per pixel. Before encoding the U ("blue-green axis") and V ("red-green axis") signals in 8 bits per pixel as well, the U and V signals are low-pass filtered and subsampled so that the encoded signal represents the chrominance values averaged over two pixels. A similar data information compression scheme also subsamples the U and V signals at a 2:1 ratio but encodes each of the Y, subsampled U and subsampled V signals in 4 bits per pixel value in four bits, also subsampling the U and V values at a 2:1 ratio.

SUMMARY OF THE INVENTION

The present invention is of a method and apparatus for decoding differentially encoded digital video color data signals and a multimedia system having video color decoder system incorporated therein. First, the differentially encoded digital decoding video color data signals are deformatted into luminance and chrominance components. The luminance and chrominance components are then differentially decompressed and converted into their red, green and blue pixel data counterparts.

BRIEF DESCRIPTION OF THE DRAWING

The present invention may be better understood, and its numerous objects, features and advantages will become apparent to those skilled in the art by reference to the accompanying drawings in which:

FIG. 12 is a timing diagram for the DYUV decompressor of FIG. 11;

FIG. 13 is a schematic diagram of a Y delta decoder of the DYUV decompressor of FIG. 11;

FIG. 18 is a timing diagram for the trans-state machine of FIG. 17;

FIG. 19 is a timing diagram for the interpolator of FIG. 16;

FIG. 20 is a schematic diagram of a YUV-to-RGB converter of FIG. 2;

DETAILED DESCRIPTION OF A PREFERRED EMBODIMENT

Figure 1:
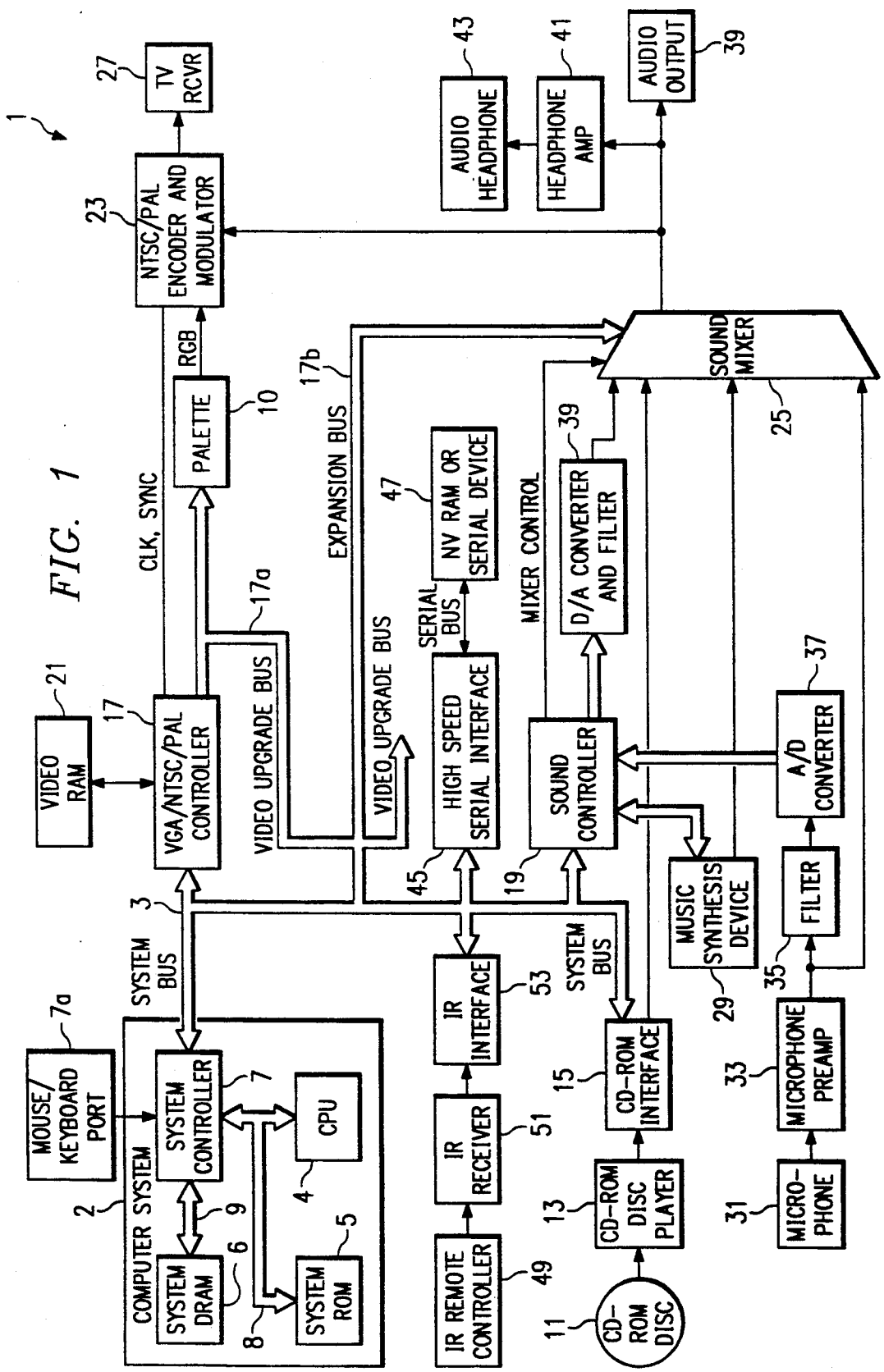
FIG. 1 is a block diagram of a multimedia system having a video color decoder constructed in accordance with the teachings of the present invention.

Referring first to FIG. 1, a multimedia system having a video color decoder constructed in accordance with the present invention shall now be described in greater detail. The multimedia system 1 is configured to receive audio and/or video signals from multiple sources and transmit the received signals to selected audio and/or video reproduction equipment associated with the multimedia system 1. The overall operation of the multimedia system 1 is controlled by a general purpose computer system 2 such as a desktop computer operably connected with the remainder of the multimedia system by a system bus 3. In addition to managing the flow of data and control signals between the various components of the multimedia system 1, it is contemplated that the computer system 2 shall be capable of running software applications and, if desired, utilizing the video and/or sound components of the multimedia system 1 for display and/or audio generation purposes.

The computer system 2 includes a central processing unit (or "CPU") 4 such as an 80286 microprocessor, a system read only memory (or "ROM") unit 5, a system dynamic random access memory (or "DRAM") unit 6 for storing and a system controller 7. The CPU 4, the system ROM 5 and the system controller 7 are interconnected by address, data and control bus 8 for the transfer of address, data and control signals therebetween. Similarly, an address, data and control bus 9 interconnects the system DRAM unit 6 and the system controller 7 for the transfer of address, data and control signals therebetween. A mouse/keyboard port 7a operatively connected to the system controller 7 is provided for operator input of data or control signals via a mouse, computer keyboard or other input device. Finally, additional data transfer and/or data storage capability is provided by a non-volatile (or "NV") RAM or serial device 47 operatively connected to the system bus 3 via a high speed serial interface 45. For example, element 47 may be a NV RAM, thereby providing powered down storage capacity. Alternately, element 47 may be a printer, modem or other serial device commonly used in two way data transfers.

Data may be input the multimedia system 1 using a compact disc read only memory (or "CD-ROM") 11 having video, audio, text, computer software, and/or other data stored thereon. For example in co-pending U.S. Pat. application Ser. No. 07/770,544 entitled "Method and Apparatus for Encoding Video Color Data Signals and Protocol for Encoding Same" and previously incorporated by reference, discloses full color video data signals digitally encoded in a format suitable for storage on a CD-ROM. The CD-ROM 11 is inserted in a CD-ROM disc player 13 which reads the digitally encoded data stored on the CD-ROM 11 and transmits the data to a CD-ROM interface 15. The CD-ROM interface 15 identifies the type of data read from the CD-ROM and transmits the data to an appropriate multimedia system component via the system bus 3. For example, video signals would most commonly be transmitted to a VGA/NTSC/PAL (or "VGA") controller 17, audio signals to a sound controller 19 and computer programs to the computer system 2, although, it is contemplated that, in certain applications, digitally encoded data would be transferred to the computer system 4 for processing and/or storage purposes before reaching its final destination. Also, certain audio signals identified by the CD-ROM interface 15 may be what is commonly referred to as "red book" audio signals and which are directly transferred to a sound mixer 25 via an audio connection between the CD-ROM interface 15 and the sound mixer 25.

Encoded video signals transferred to the VGA controller 17 are transferred to a video RAM 21 for storage prior to display. To display selected ones of the encoded video signals stored in the video RAM 21, the VGA controller 17 instructs the video RAM 21 to transmit the selected encoded digital video signals to a palette 10 via the VGA controller 17. In a manner described in much greater detail below, the palette 10 decodes the encoded digital video signals, converts the signals into red, green and blue (or "RGB") components, and then converts the RGB video signals into analog form. It is contemplated that the VGA controller 17 will be configured to drive the operation of the palette 10 in various modes, thereby enabling the multimedia system to display high color content natural images, animation images as well as combinations of the two. Additionally, a video upgrade bus 17a is provided so that auxiliary boards (not shown) capable of driving the operation of the palette 10 in still other imaging modes may be installed in the multimedia system 1. It is further contemplated that the palette 10 will be configured to perform multiple modes of decoding, including compressed YUV and border encoding, thereby permitting the multimedia system 1 to produce an enhanced display of various types of video data, including full motion, animated and still images.

The analog RGB video signals are then transmitted to a NTSC/PAL encoder and modulator 23 which, under the control of the clock (or "CLK") and synchronizing (or "SYNC") signals from the VGA controller 17, modulates the received RGB video signals into a form suitable for display by the video display component of television receiver 27. Audio signals are transmitted to the audio generation component of the television receiver 27 by a sound mixer 25 which transmits audio signals to the NTSC/PAL encoder and modulator 23 which synchronizes the audio and video signals before transmission to the television receiver.

As previously discussed, the multimedia system 1 includes a sound controller 19 which, in conjunction with the system controller 7, controls the transmission of audio signals between various sources and destinations. In addition to those audio signal sources and destinations previously discussed, digital audio signals may also be generated by a music synthesis device 29 and transmitted directly to the sound controller 19 or by the computer system 2 and transmitted to the sound controller 19 via the system bus 3. Analog input audio signals such as live sounds may be detected by a microphone 31, transmitted to a microphone pre-amp 33 which amplifies the input audio signal, filtered by an anti-aliasing filter 35, digitized by an analog to digital converter 37 and transmitted to the sound controller 19, although, in an alternate embodiment of the invention, the output of the microphone pre-amp 33 may be transmitted directly to the sound mixer 25. The sound controller 19 transmits the digital audio signals received from the various sources and transmits the audio signals to a digital to audio converter 39 for conversion to analog and, in turn, to the sound mixer 25.

In addition to the multiple source originating, analog audio signals received from the digital to analog converter 39, the sound mixer 25 is connected to receive audio signals from the CD-ROM interface 15, the music synthesis device 29, the microphone pre-amp 33 and, if direct audio capability is installed on the expansion 17b to the system bus 17, from the expansion bus 17b as well. Under control signals generated by the sound controller 19, the sound mixer 25 will select the audio signal to be output and propagate the selected to an audio output 39 which may be, for example, a speaker system, or, via a headphone amp 41, to an audio headphone 43.

Operator control of the various components of the multimedia system 1 from a remote location is provided by a hand-held infra-red remote controller 49. Upon operator actuation, the infra-red remote controller 49 transmits a control signal capable of detection by a IR receiver 5 which also transmits the detected control signal to the system bus 3 via an IR interface 53.

Figure 2:
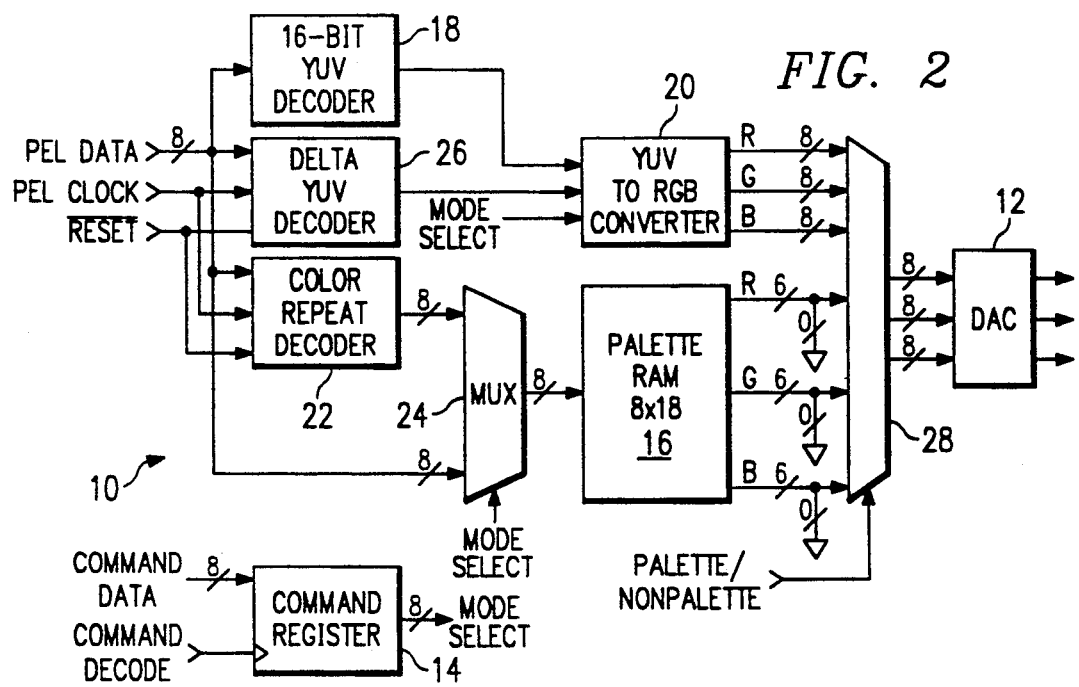
FIG. 2 is a block diagram of a palette of the multimedia system of FIG. 1 which has the video color decoder system incorporated therein.

Referring next to FIG. 2, the VGA controller 17 transmits encoded 8 bit video pixel element (or "PEL") data, a clock signal and a blank signal to the palette 10. Depending upon the mode previously utilized to encode the transmitted PEL data, the palette 10 will decode the PEL data in a selected one of various decoding techniques and convert the decoded PEL data into its 8 bit red, green, and blue components for output. Command information related to the data encoding mode utilized is written to a command register 14, which, in turn, selects one of the following PEL data decoding modes: 16 bit YUV decoding, delta YUV decoding, or color repeat decoding. As will be described in greater detail below, a palletized decoding mode which utilizes an 8×18 palette RAM 16 may also be selected.

If the command information written to the command register 14 indicates that 16 bit YUV encoding had been utilized to encode the PEL data, the command register 14 will select a 16 bit YUV decoder 18 to decode the 8 bit PEL data received by the pal®the 10 and the decoded PEL data will then be transferred from the 16 bit YUV decoder to the YUV-to-RGB Converter 20. If, on the other hand, the written command information indicates that color repeat encoding had been utilized to encode the PEL data, the command register 14 will select a color repeat decoder 22 to decode the 8 bit PEL data. After the PEL data is decoded, the color repeat decoder 22 will transmit the decoded PEL data to a multiplexor 24 which selects either the color repeat decoded data or the original PEL data depending upon the mode required. In this case, the multiplexor 24 will select the 8 bit color repeat decoded data to enter the 8×18 Palette RAM 16 to be further converted to 6-bit components of red, green and blue video pixel data.

The red, green and blue 8 bit pixel data from either the YUV-to-RGB converter 20 or from the 8×18 palette RAM 16 enters a multiplexor 28 which selects the appropriate pixel data to enter the digital-to-analog converter 12 to be converted to analog video pixel signals. The command register 14 sends a signal to the multiplexor 28 to select the appropriate pixel data for transmission to the digital-to-analog converter 12.

The 16-bit YUV decoder 18 decodes PEL data that had been compressed by a differential encoding of each Y, U and V value in eight bits and subsampling the U and V values at a 2:1 ratio. In this mode the signal is completely defined every two pixels.

The color repeat decoder 22 decodes the PEL data that had been compressed by color repeat encoding each PEL with four bits. The four bits provide a color-look-up-table (or "CLUT") address to the palette. Each non-zero pixel value is latched simultaneously while being presented to the CLUT. If all four bits of a pixel are zero, then the previous non-zero latched color value is sent to the CLUT. So long as the pixel value equals zero, the previously latched non-zero value is repeated until a new non-zero value is given.

Figure 3:
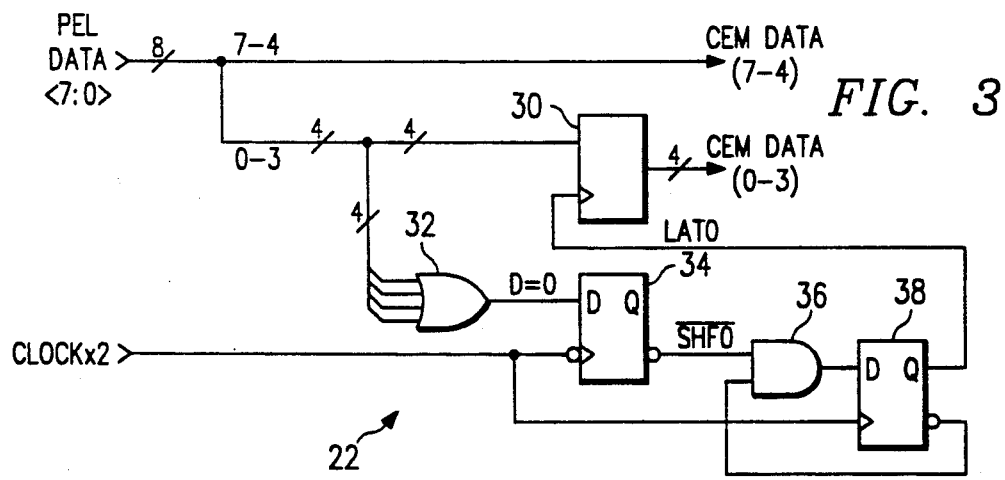
FIG. 3 is a block diagram of a color repeat decoder of FIG. 2.
Figure 4:
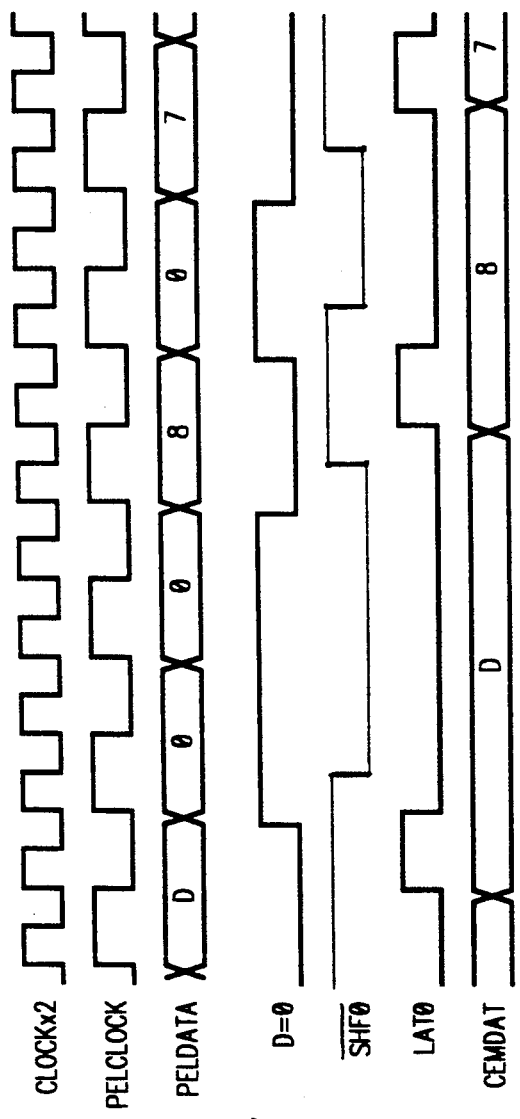
FIG. 4 is a timing diagram for the color repeat decoder of FIG. 3.

Referring to FIG. 3, incoming pixel data (DAT 7-φ) from the VGA controller 17 is split so that the upper nibble bypasses the color repeat decoder 22. Bits 0 through 3 are latched into 4-bit latch 30 by the signal Lat 0, which is designed to clock the latch 30 on any cycle in which non-zero data is presented. When the lower four bits of data equal zero, four-input OR gate 32 will respond and will be latched into flip-flop 34, whose inversed output will be added to the inversed output of flip-flop 38 by an adder 36. If the lower four bits of data do equate to zero, then the adder 36 will produce an output to flip-flop 38, causing the output of flip-flop 38, Lat 0, to not toggle latch 30, thus holding the existing data in latch 30. The timing diagram in FIG. 4 illustrates this process.

Referring again to FIG. 2, if n decoding of the PEL data is necessary, the PEL data is directly sent to the 8×18 palette RAM 16 via multiplexor 24.

The 8×18 palette RAM 16 receives either the undecoded PEL data or the color repeat decoded PEL data and provides a conversion of this data to a 6-bit red, green and blue form. Two lower significant bits are then added to each component to form 8 bit red, green and blue pixel data components which are directed to multiplexor 28.

Figure 5:
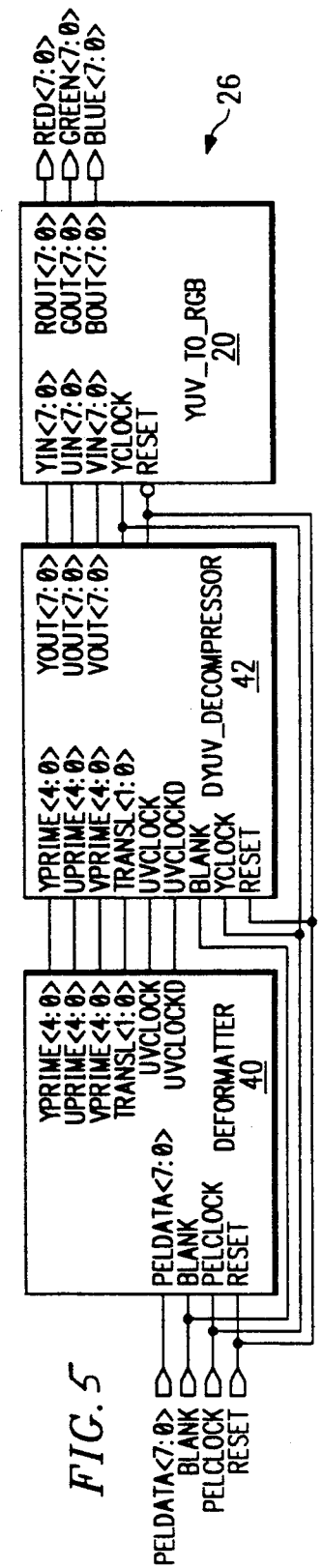
FIG. 5 is a block diagram of a delta YUV decoder of FIG. 2.

PEL data encoded by a compressed YUV method are decoded by the delta YUV decoder 26, which is described in detail in FIGS. 5-22. Referring to FIG. 5, the delta YUV decoder 26 shown in FIG. 2 is comprised of a deformatter 40 and a DYUV decompressor 42. The YUV-to-RGB converter 20 is also shown in FIG. 4.

8 bit PEL data, a blank signal, a reset signal and a clock signal labelled Pelclock, enter the delta YUV decoder 26. The Pelclock is also directed to the DYUV decompressor 42 and the YUV-to-RGB converter 20 where it is redesignated as the Yclock since it becomes the clock signal utilized to move the Y data, or luminance component of the pixel data, through the different sections of the DYUV decompressor 42 and the YUV-to-RGB converter 20. The blank signal, utilized to "blank" the video screen between each full raster scanning of the video screen, is also directed to the DYUV decompressor 42. The blank signal is utilized to initialize the running sum registers within the DYUV decompressor 42 in preparation for new data values between the raster scans of each line of pixels. The reset signal initializes all circuit components on power up. This signal is also directed to the DYUV decompressor 42 and the YUV-to-RGB converter 20.

The deformatter 40 extracts the Y, U, V pixel data components and the transition codes from the 8 bit PEL data stream. These codes are labelled as Yprime, Uprime, Vprime and Transl. The Yprime, Uprime and Vprime codes are each 5 bits, and the Transl code is composed of 2 bits. In addition UVclock and UVclockd (delayed UVclock) signals are derived from the Pelclock. The UVclook and UVclockd are utilized in the deformatter 40 and DYUV decompressor 42 to transport the U and V chrominance components throughout these sections.

The Yprime, Uprime, Vprime, Transl, UVclook and UVclockd are transmitted from the deformatter 40 to the DYUV decompressor 42 where the 5 bit Yprime, Uprime and Vprime components are expanded to 8 bit values, followed by an interpolation Of the U and V components for those pixel element values occurring at each color transition.

The 8 bit Y, U and V decoded data—labelled as Yout, Uout and Vout in FIG. 5—exits from the DYUV decompressor 42 and is clocked into the YUV-to-RGB converter 20 where this data is matrixed, or converted, into 8 bit red, green and blue components. The 8 bit red, green and blue components exit the YUV-to-RGB converter 20 and are clocked into the multiplexor 28, shown in FIG. 1, which subsequently transmits this data to the digital-to-analog converter 12 for conversion into video analog signals.

Figure 6:
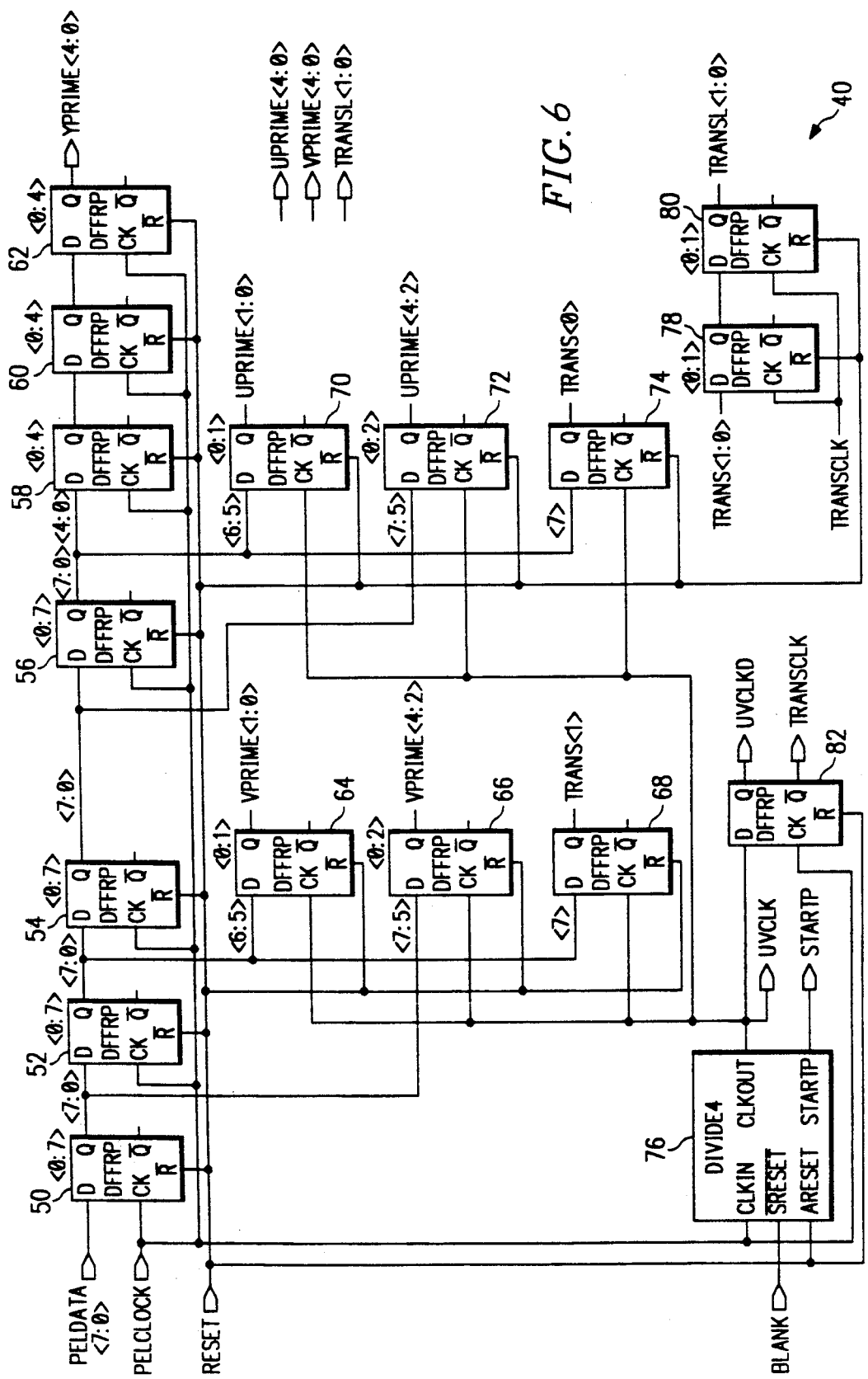
FIG. 6 is a schematic diagram of a deformatter of FIG. 5.

Referring now to FIG. 6, the 8 bit PEL data is clocked through flip-flops 50, 52, 54 and 56 by the Pelclock. The bytes located at the outputs of the flip-flops 50, 52, 54 and 56 are simultaneously clocked to various sections of the deformatter 40 by the UVclock which is produced by the divide 4 circuit 76 and which is at one-fourth the frequency of the Pelclock.

Figures 7, 8:
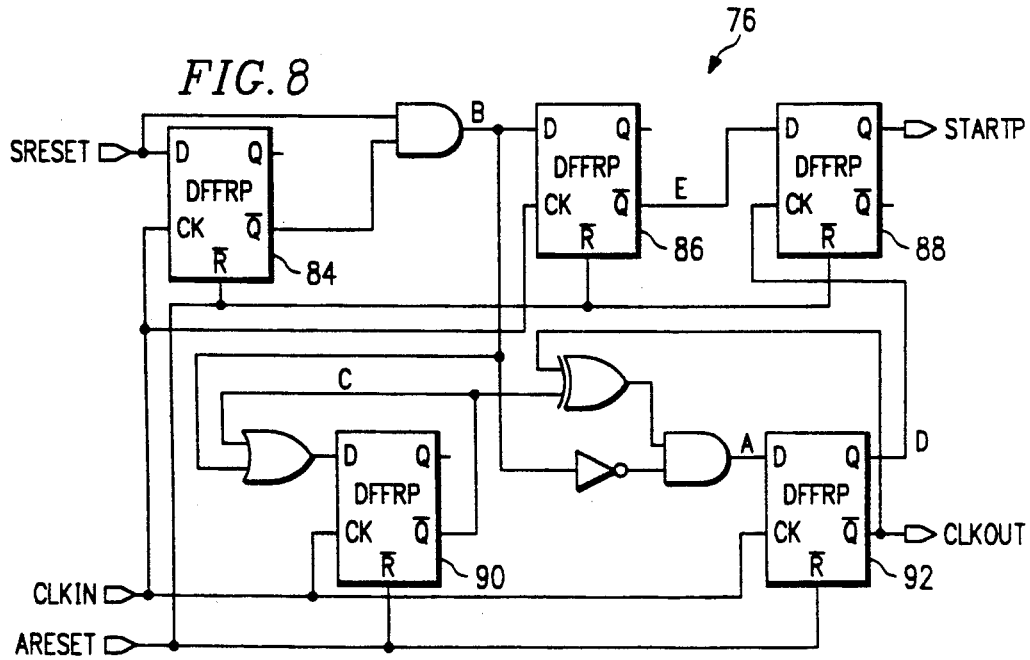
FIG. 7 is a diagram of a differentially compressed YUV pixel field.
FIG. 8 is a schematic diagram of a divide-by-four circuit of FIG. 6.

The separate bytes located at each flip-flop 50, 52, 54 and 56 are shown in FIG. 7. Returning to FIG. 6, byte 1 will be located at the output of flip-flop 56, byte 2 located at flip-flop 54, byte 3 located at flip-flop 52 and byte 4 located at flip-flop 50. Bytes 1-4 contain all the pixel information needed to define the luminance and chrominance components and the position of any color transitions for a sequence of four pixels. It is at this point where these different elements of information are pipelined through different sections of the deformatter 40 and then combined into the separate data streams Yprime, Uprime, Vprime and Transl corresponding respectively to the differential Y luminance, differential U chrominance, differential V chrominance and position code components. These separate data streams are then ready for decoding and decompression by the DYUV decompress 42.

On the fourth clock cycle of Pelclock, byte 1 is located at the output of flip-flop 56. The five least significant bits are directed to flip-flop 58. These five bits define the differential Y luminance component for the first pixel element, PEL, of a four-pixel sequence as shown in FIG. 7. Bits 5 and 6 of byte 1 contain differential U chrominance bits 3 and 4, which along with differential U chrominance bits 0, 1 and 2 from bits 5, 6 and 7 of byte 2 define the differential U chrominance value for all four PEL of a four-pixel sequence. Returning to FIG. 6, bits 5 and 6 of byte 1 are directed to flip-flop 70. Bit 7 of byte 1 contains bit 0 of the 2-bit position code indicating where in the four-pixel sequence a major color transition might occur. Bit 7 is directed to flip-flop 74.

The output of flip-flop 54 contains byte 2 which is shown in FIG. 7. The five least significant bits contain the differential Y luminance component for the second PEL of a sequence of four bits. Bits 5, 6 and 7 contain bits 0, 1 and 2 of the five bits required to define the differential U chrominance value for the four-pixel sequence. In FIG. 6, bits 5, 6 and 7 are directed to flip-flop 72. Bits 0–4 are directed to flip-flop 56.

The output of flip-flop 52 contains byte 3. As shown in FIG. 7, the five least significant bits of byte 3 contain the differential Y luminance component for the third PEL in a sequence of four pixels. Bits 5 and 6 of byte 3 contain bits 3 and 4 of the differential V chrominance component for the four-pixel sequence. Bit 7 of byte 3 contains bit of the position code.

Referring again to FIG. 6, bits 0–4 of byte 3 are directed to flip-flop 54, bits 5 and 6 are directed to flip-flop 64 and bit 7 is directed to flip-flop 68. In FIG. 7, byte 4 contains the differential Y luminance component for the fourth PEL of a four-pixel sequence. This component is encoded in bits 0–4. Bits 5–7 of byte 4 contain bits 1-3 of the differential V chrominance encoded value for the four pixels of a sequence. Referring to FIG. 6, byte 4 is at the output of flip-flop 50. Bits 0–4 are directed to flip-flop 52 while bits 5–7 are directed to flip-flop 66.

On the next clock cycle, the divide 4 circuit 76 produces a clock signal, UVclock, which toggles flip-flops 64, 66, 68, 70, 72 and 74 allowing their respective bits to cycle through. In addition, the Pelclock toggles flip-flops 50, 52, 54, 56, 58, 60 and 62 allowing the data present at their respective inputs to cycle through. It is through this previously described arrangement of flip-flops that the differential Y, U, V and position code components are partitioned from the original pixel data stream and separately united to form the Yprime, Uprime, Vprime and Transl data streams.

The differential Y luminance bit components are cycled through flip-flops 50, 52, 54, 56, 58, 60 and 62 producing the Yprime output. Flip-flops 58, 60 and 62 are present for synchronization purposes since the U, V and Transl components are clocked through the deformatter 40 and DYUV decompressor 42 at one-fourth the frequency of the Y luminance components.

Bits 5 and 6 of byte 1 and bits 5–7 of byte 2 are cycled through flip-flops 70 and 72 respectively and combined to form the Uprime output data stream. Bits 5 and 6 of byte 3 and bits 5–7 of byte 4 are cycled through flip-flops 64 and 66 respectively to form the Vprime output data stream.

Bit 7 of byte 1 and bit 7 of byte 3 are cycled through flip-flops 74 and 68 respectively to form a 2-bit Transl output. The Transl signal is then further cycled through flip-flops 78 and 80 so that all the components of the video pixel data are properly synchronized.

The clock signals, Uvclock and Transclock, for toggling flip-flops 64, 66, 68, 70, 72, 74, 78 and 80 are provided by the Divide 4 Circuit 76. The UVclock signal is one-fourth the frequency of the Pelclock signal since the UVclock cycles the U and V chrominance components through the delta YUV decoder 26, and these components are only required to change every four pixels whereas the Y component changes every pixel. In addition, the Transclock signal is also one-fourth the frequency of the Pelclock signal since the position ode, which is cycled by the Transclock, is only required to be designated every four pixels. Thus, the divide 4 circuit 76 is necessary to produce clock signals at One-fourth the frequency of the Pelclock.

Referring to FIG. 8, three signals are inputted to the divide 4 circuit 76—Clock-in, A-Reset and S-Reset. A-Reset is connected to the Reset on all flip-flops 84, 86, 88, 90 and 92 within the divide 4 circuit 76. A-Reset originates from the system power up reset which is utilized to asynchronously reset all flip-flops within the delta YUV decoder 26 on power up.

Clock-in, originating from the Pelclock signal, is utilized to toggle flip-flops 84, 86, 90 and 92. S-Reset originates from the active low blank signal supplied to the delta YUV decoder 26 by the VGA controller circuitry. S-Reset becomes inactive, or high, whenever the blank signal goes high, allowing the decoder circuitry to be resynchronized at the start of each horizontal line of pixels.

Figure 9:
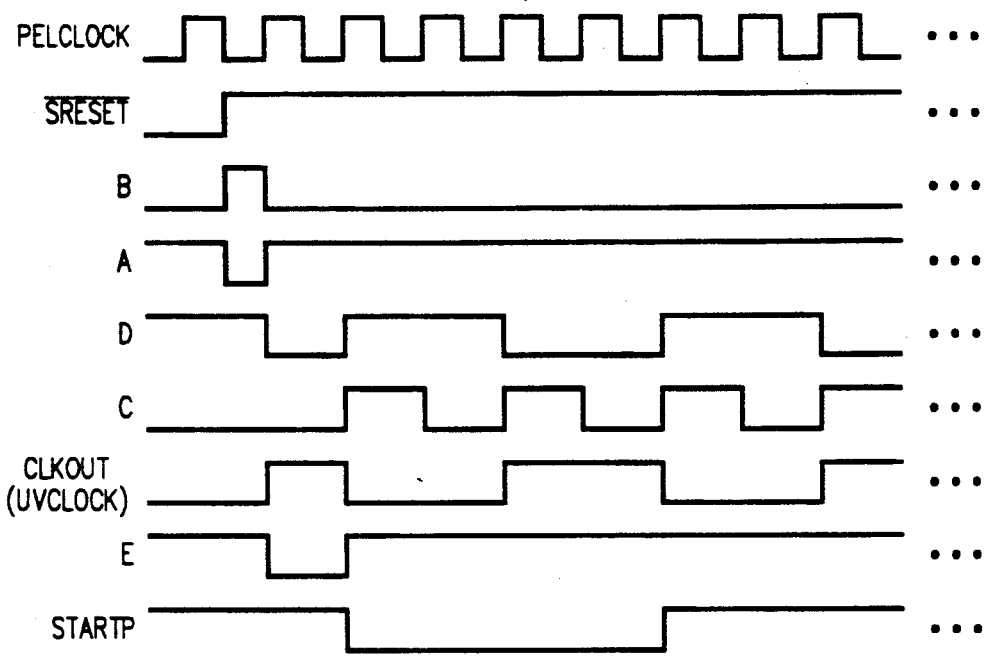
FIG. 9 is a timing diagram of a flow process through the divide-by-four circuit.

FIG. 9 shows the timing diagram of the divide 4 circuit 76. It indicates how the outputs of this circuit are produced and their timing. The divide 4 circuit 76 produces a Clock-out signal which is utilized to cycle the U and V chrominance components through the delta YUV decoder 26 circuitry. This signal, which is at one-fourth the frequency of the Pelclock is labeled UVclock. The Clock-out is also utilized to produce the Transclock signal which is also at one-fourth the frequency of the Pelclock. The Transclock is required to be one Pelclock cycle ahead of the UVclock, therefore the Clock-out is directed to a flip-flop 82 as shown in FIG. 6 and inverted to produce the correctly timed Transclock. Flip-flop 82 also produces a delayed UVclock signal utilized in interpolating the U and V chrominance values.

The divide 4 circuit 76 also provides a Start signal utilized in the DYUV decompressor 42.

Again referring to FIG. 6, the Pelclock, UVclock and Transclock signals cycle the PEL data into and through the deformatter 40 eventually producing the separate output data streams—the 5 bit Yprime, Uprime and Vprime and the 2-bit Transl. The timing is synchronized so that every four bytes of PEL data produces the necessary information for the color values of each pixel in a four-pixel sequence. This process, which is continuously repeated, is illustrated by the timing diagram in FIG. 10. As indicated, the UVclock is one-fourth the frequency of the Pelclock. The Pelclock cycles the Y luminance data and the UVclock cycles the U and V chrominance data through the circuitry. The Transclock, which is also at one-fourth the frequency of the Pelclock, cycles the Transl code through the circuitry.

Figure 11:
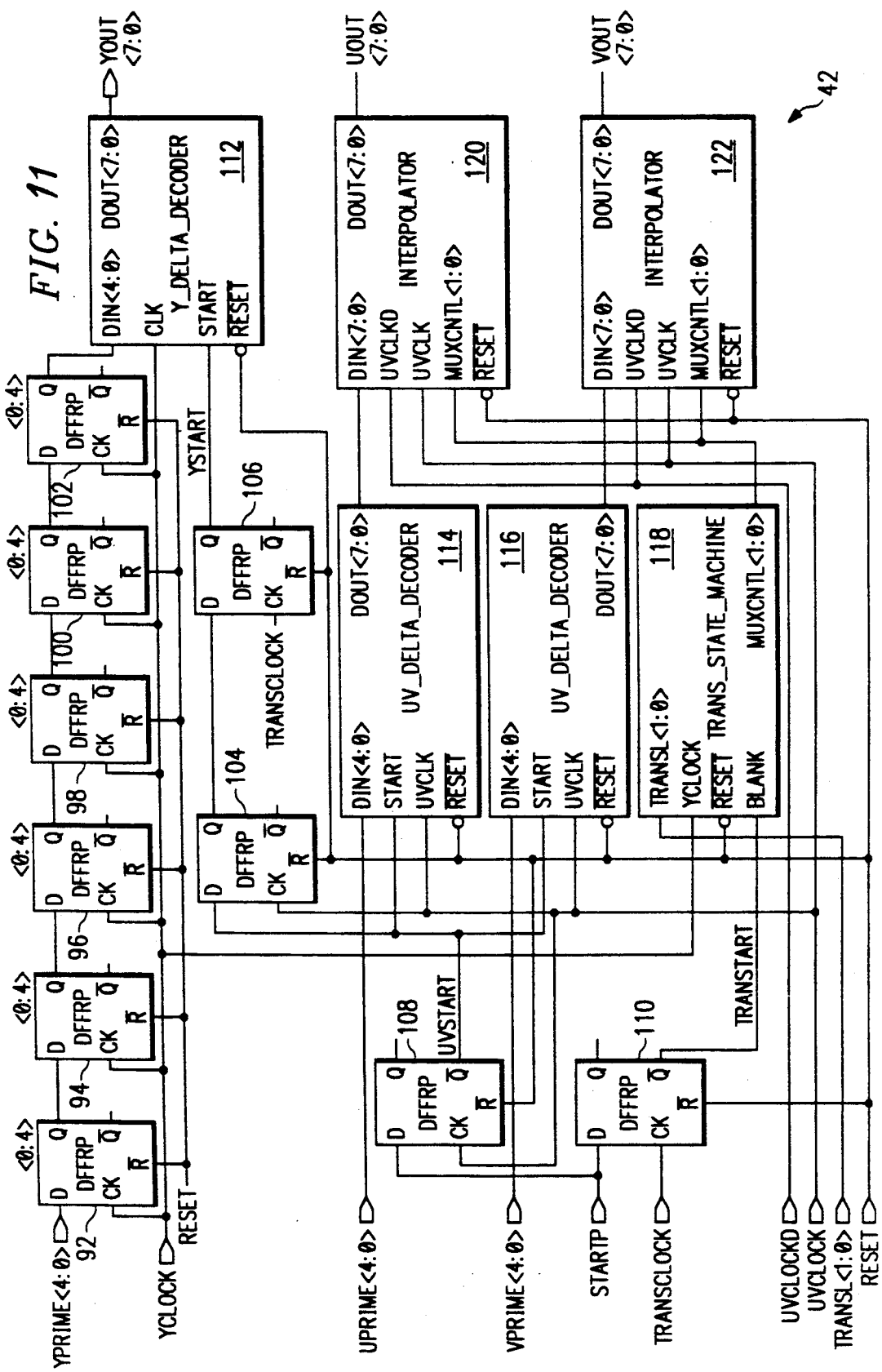
FIG. 11 is a schematic diagram of a DYUV decompressor of FIG. 5.

Referring to FIG. 11, the data exiting the deformatter 40 enters the DYUV decompressor 42 where it is transformed into 8 bit per pixel values of Y luminance, U chrominance and V chrominance components. The incoming data signals consist of Yprime, Uprime, Vprime, Pelclock, Start, Transclock, UVclock, UVclockd, Transl and Reset. Yprime, Uprime, Vprime and Transl contain the data needed to define each pixel. Pelclock, UVclock and Transclock are the timing signals needed to cycle the data signals through the circuitry. StartP signals the DYUV decompressor 42 components to accept initialization values for the incoming data streams at the start of a line. And, Reset is a signal used to reset the components of the DYUV decompressor 42 on power up.

The 5 bit Yprime data enters the DYUV decompressor 42 and is cycled through flip-flops 92, 94, 96, 98, 100 and 102 by the Pelclock. These flip-flops are present for timing purposes only so that the Yprime, Uprime, Vprime and Transl data streams are all aligned synchronously. The Yprime data then enters a Y Delta Decoder 112 when signalled to do so. The incoming Uprime and Vprime data enters UV delta decoders 114 and 116 at appropriate times. The 2-bit Transl data enters a Trans State Machine 118 when properly signalled.

The StartP signal, which is generated within the deformatter 40, is the timing signal that allows the initialization value for each line of the Yprime, Uprime, Vprime and Transl data to be cycled into the DYUV decompressor 42. Referring to FIG. 11 and the timing diagram in FIG. 12, when StartP gets low, the inversed output of flip-flop 108 will become high when flip-flop 108 is toggled by UVclock. The inverse output of flip-flop 108, designated as UVstart, signals the UV Delta Decoders 114 and 16 to load their accumulation registers with the initialization values given at the start of each line . Additionally, the UVstart signal is cycled through flip-flop 104 when it is toggled by UVclock. The output signal from flip-flop 104 will cycle through flip-flop 106 when flip-flop 106 is toggled by the Transclock. The output of flip-flop 10 is the Ystart signal which loads the initialization value for the Yprime data into the Y delta decoder 112.

StartP also enters flip-flop 110 which, when toggled by the Transclock, produces a Transtart signal at its inversed output. Transtart synchronizes the operation of the trans state machine 118 at the start of each line.

The Y delta decoder 112 decompresses the 5 bit differential Yprime data into 8 bit per pixel Y luminance components, labelled as Yout in FIG. 11. The 8 bit Yout data is then transmitted to the YUV-to-RGB converter 20.

The UV delta decoders 114 and 118 decompress the differential Uprime and Vprime data streams into 8 bit per pixel U and V chrominance components respectively. These 8 bit outputs are directed to interpolators 120 and 122 where the U and V chrominance values are designated for the pixels before and after each color transition, and an interpolated color value is calculated for the pixel occurring immediately prior to a color transition. The outgoing data from the Interpolators 120 and 122, labelled Uout and Vout respectively, is then directed to the YUV-to-RGB Converter 20.

Referring to FIG. 11, incoming 5 bit Yprime data will be cycled into the Y delta decoder 112 when the Ystart signal becomes high. Referring to FIG. 12, the Ystart signal has a width of four cycles to provide the pixel values for the first four-pixel sequence to be initialized on each horizontal pixel line. This is accomplished by the Ystart signal choosing input I1 in Mux2by8 136. This selection bypasses the remainder of the circuitry of the Y delta decoder 112 which calculates a running sum of Y luminance difference values to calculate an 8 bit per pixel Y luminance value for the subsequent pixels in each horizontal pixel line.

When Ystart goes high, the 5 bit Yprime data enters the Y delta decoder 112. For the first pixel of the first four-pixel sequence of each line, the Ystart signal selects the 8 bit I1 input to the Mux2by8 136. The Yprime data is toggled through flip-flop 138 by the Pelclock. Flip-flop 138 is present for timing purposes only. The 5 bit Yprime data exits flip-flop 138 and enters 8 bit input I1 to the Mux2by8 136 as bits 3-7; bits 0-2 are set to zero by virtue of being grounded. Thus input I1 consists of 8 bits with the five most significant bits comprised of the 5 bit Yprime data. The Mux2by8 136 transmits the 8 bit word to accumulation register 140, used for accumulating a running sum of the Yprime data, and the output of the Y Delta Decoder 112. This 8 bit word becomes the initial Y luminance value for the first pixel of a horizontal line of pixels.

This outputted 8 bit initial luminance value is also fed back to an Add 8×2 Block 134 so that the next 8 bit luminance difference value can be added to the initial value to derive the Y luminance value for the next pixel in a horizontal line of pixels.

Figure 14:
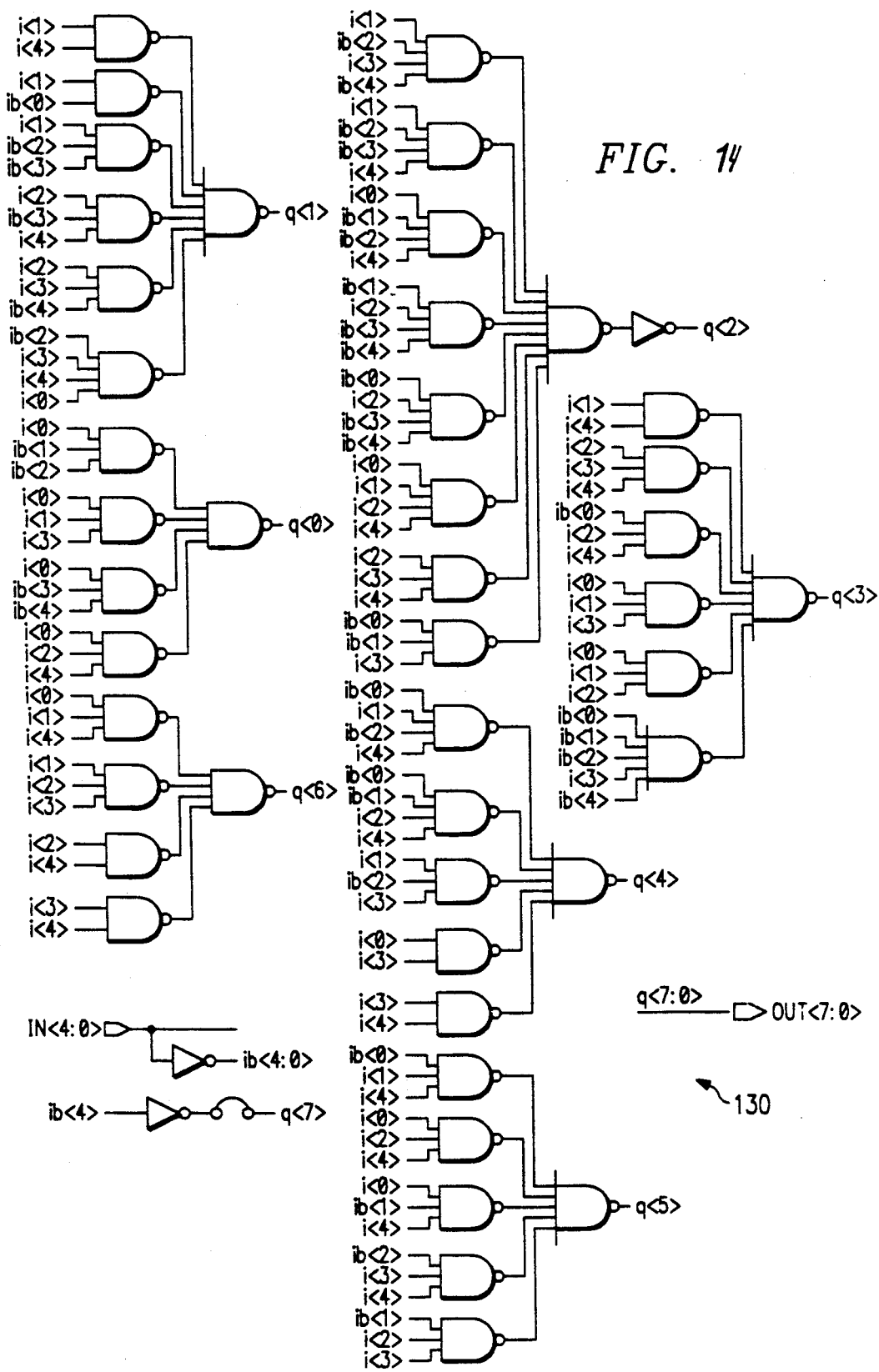
FIG. 14 is a schematic diagram of a 5 bit to 8 bit expander of FIG. 13.

After the Ystart has entered the initial Y luminance component, the Ystart signal becomes low thus selecting the input I$\phi$ to the Mux2by8 136. The subsequent 5 bit Y luminance difference values enter an expand 5 to 8 block 130 where the 5 bit difference values are expanded back to their original 8 bit values. The expansion circuitry is shown in FIG. 14. The circuitry implements the conversion table set forth below.

| 5 bit Values | 8 bit Values |
| --- | --- |
| 0 | 0 |
| 1 | 1 |
| 2 | 2 |
| 3 | 3 |
| 4 | 4 |
| 5 | 5 |
| 6 | 6 |
| 7 | 9 |
| 8 | 12 |
| 9 | 17 |
| 10 | 22 |
| 11 | 29 |
| 12 | 38 |
| 13 | 50 |
| 14 | 66 |
| 15 | 91 |
| 16 | 128 |
| 17 | 165 |
| 18 | 190 |
| 19 | 206 |
| 20 | 218 |
| 21 | 227 |
| 22 | 234 |
| 23 | 239 |
| 24 | 244 |
| 25 | 247 |
| 26 | 250 |
| 27 | 251 |
| 28 | 252 |
| 29 | 253 |
| 30 | 254 |
| 31 | 255 |

After expansion to 8 bits, the deference value data toggles through flip-flop 132, used for timing and enters an input A to the add 8×2 block 134. The add 8×2 block 134 sums each 8 bit luminance difference value to the preceding sum of 8 bit luminance difference values. Thus, the luminance value for each pixel within a horizontal pixel line is computed and directed to the output of the Y delta decoder 112. This running sum is accomplished by feeding back the outputted sum to input B of the add 8×2 block 134. This sum entering input B is added to the next luminance difference value entering input A of the add 8×2 block 134. This process is repeated until all pixels within a horizontal pixel line are designated with a Y luminance value. Then, another Ystart signal will begin the process anew for the next horizontal line of pixels.

Figure 15:
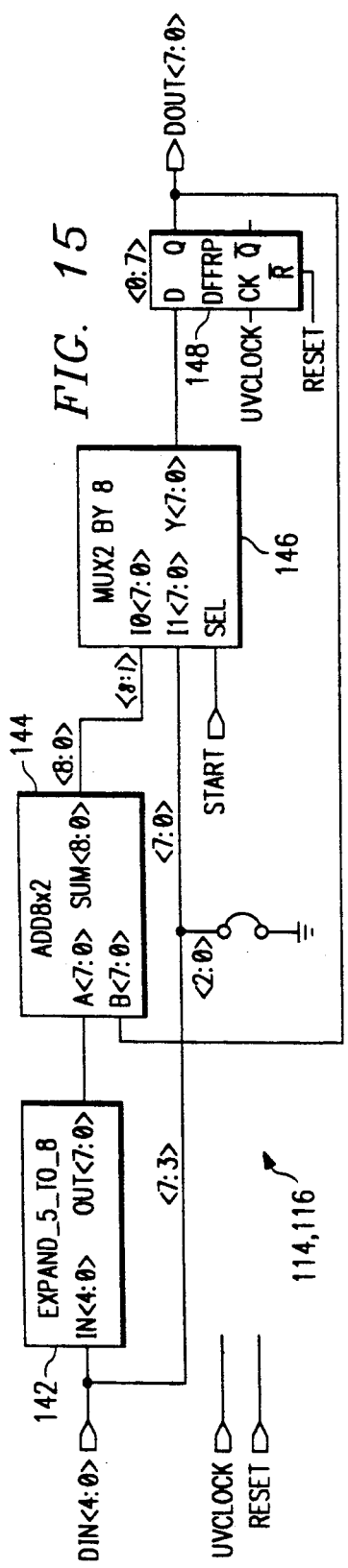
FIG. 15 is a schematic diagram of a UV delta decoder of FIG. 11.
Figure 16:
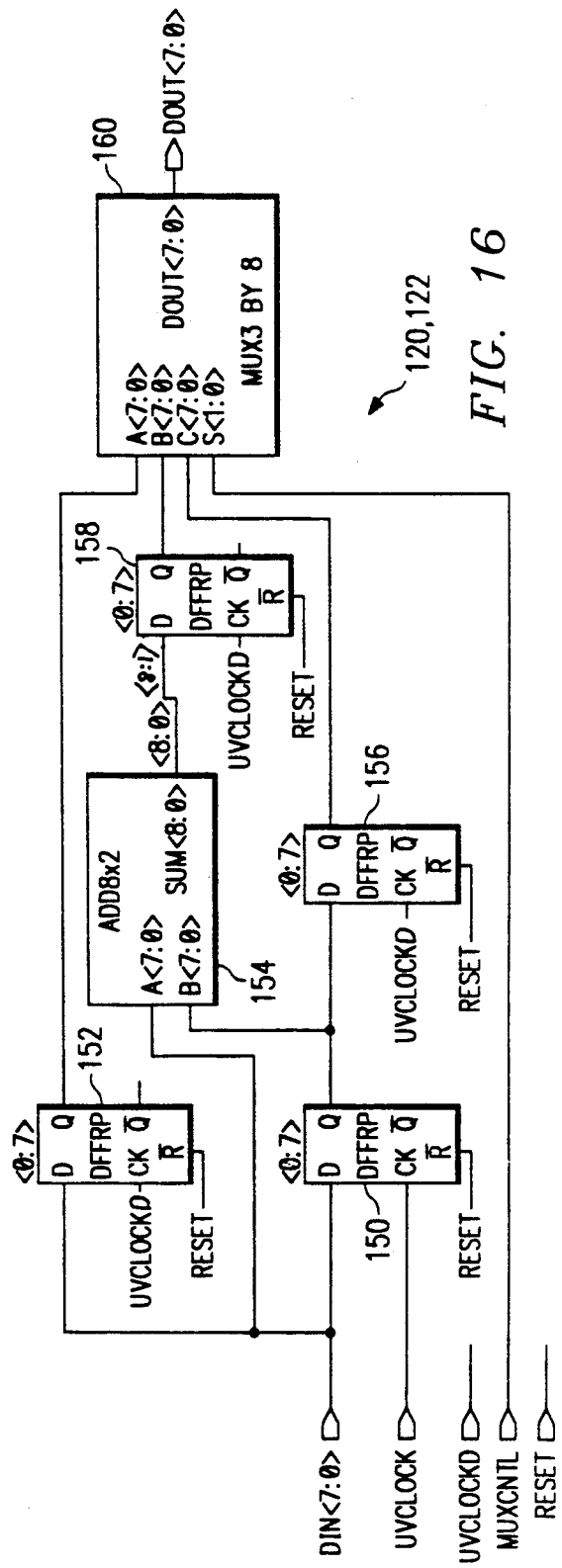
FIG. 16 is a schematic diagram of an interpolator of FIG. 11.

The 5 bit Uprime and Vprime data are decoded and expanded to 8 bit values in the UV delta decoders 114 and 116 respectively, as illustrated in FIG. 15., which are identical to the Y delta decoder 112 with the exception that the timing flip-flops 132 and 138 ar not required. The outputs of the UV delta decoders 114 and 116 produce 8 bit U and V chrominance components for each four-pixel sequence. These outputs are directed to two Interpolators 120 and 122.

Figure 10:
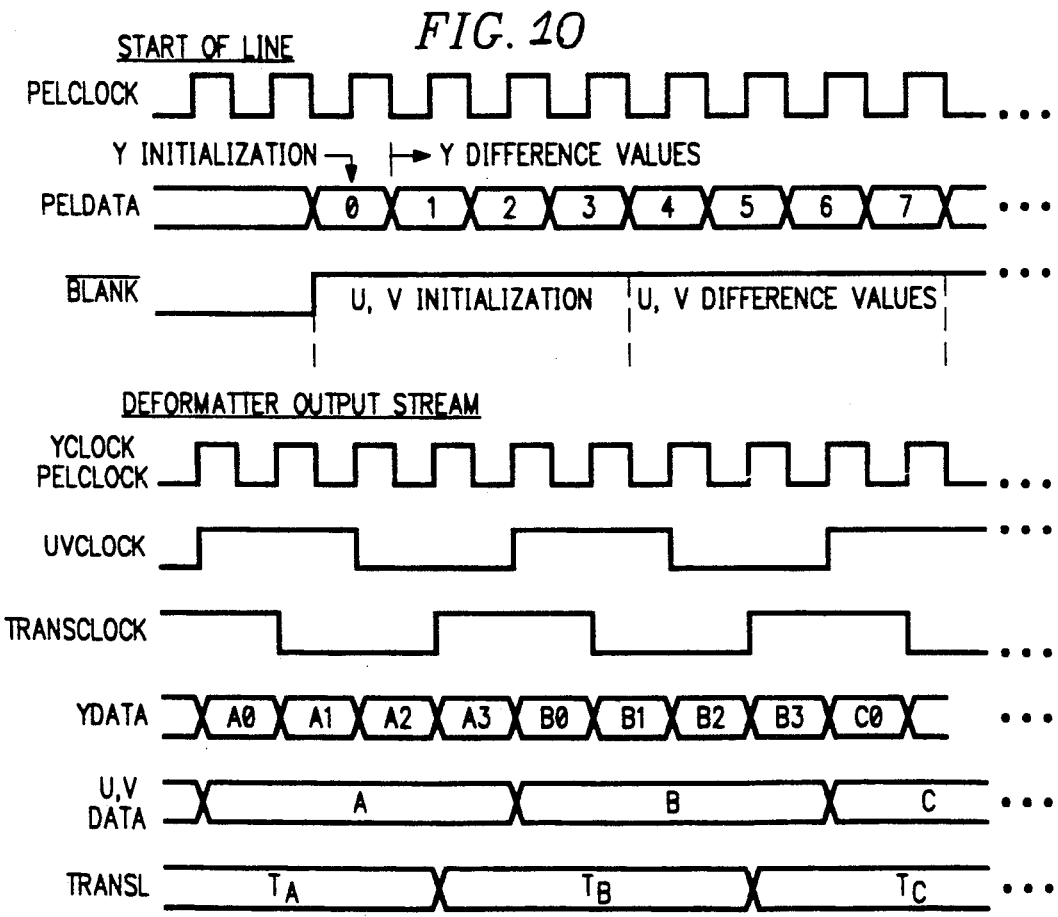
FIG. 10 is a timing diagram for the deformatter of FIG. 6.

Referring to FIG. 10, interpolators 120 and 122, which are identical, receive the 8 bit U and V chrominance components from the UV delta decoders 114 and 116, and also receive the UVclock, the UVclockd, the system reset and a 2-bit control signal, labeled Muxcntl.

In the interpolator 120, the 8 bit U chrominance data for successive groups of four pixels is presented to three different data paths. The U chrominance data is manipulated so that a MUX 3by8 multiplexor 160 is presented with the U chrominance value for a group of four pixels, the U chrominance value for the previous group of four pixels and an interpolated U chrominance value, equal to the average between the U chrominance values for a group of four pixels and the previous group of four pixels.

For example, if the U chrominance value, N, for the N group of four pixels enters the interpolator 120, it will be simultaneously presented to timing latch 152, storage latch 150 and add 8×2 Block 154. The UV clock signal, UVclook, has already cycled through storage latch 150 the previous U chrominance value, N−1, for the previous group of four pixels. This U chrominance value, N−1, is then added to the U chrominance value, N, in the add 8×2 Block 154. The least significant bit is subsequently dropped, effectively dividing by two the added value of N+(N−1). This averaged U chrominance value is presented to timing latch 158. The delayed UV clock signal, UVclockd, then toggles timing latches 152, 156 and 158. timing latch 152 cycles through the U chrominance value, N, to input A Of the MUX 3by8 multiplexor 160. Timing latch 158 cycles through the interpolated U chrominance value, N+(N−1)/2, to input B of the MUX 3by8 multiplexor 160. timing latch 156 cycles through the previous U chrominance value, N−1, to input C of the MUX 3by8 multiplexor 160.

These three U chrominance values N, N−1 and N+(N−1)/2 are then utilized to determine the U chrominance values for each pixel within a group of four pixels. The Muxcntl signal controls the selection of U chrominance values. The Muxcntl signal is dependent upon the value of the 2-bit position code, Transl, which determines where in a sequence of four pixels a color transition occurs. If the position code is a 0, then the color transition occurs between the first and second pixels within a sequence of four pixels. If the position code is a 1, then the color transition occurs between the second and third pixels within a sequence of four pixels. If the position code is a 2, then the color transition occurs between the third and fourth pixels within a sequence of four pixels. And, if the position code is a 3, then the color transition occurs between the fourth pixel of a sequence of four pixels and the first pixel in the subsequent sequence of four pixels. The previously described process is also enabled for the V chrominance data passing through the interpolator 122.

For a smoother transition of color, an interpolated value for the U and V chrominances can be inserted in the pixel immediately preceding the color transition.

Figure 17:
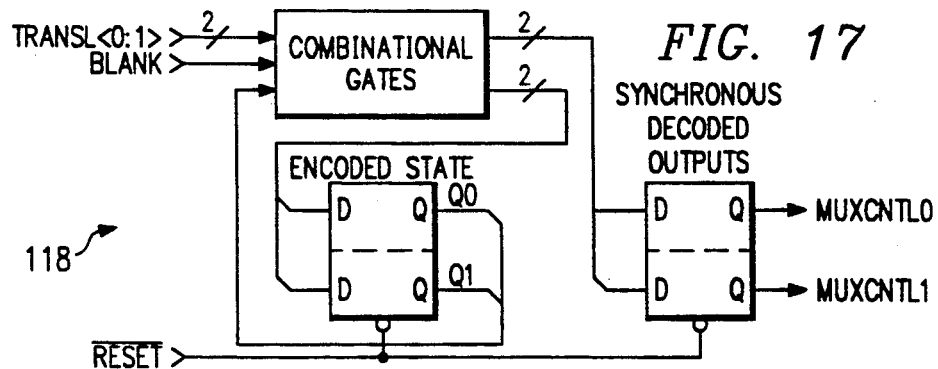
FIG. 17 is a schematic diagram of a trans-state machine of FIG. 11.

The Muxcntl signal originates in a trans machine 118, shown in FIGS. 11 and 17. Upon the Transtart signal becoming high, the trans state machine 118 receives the 2-bit Transl code and produces a series of control signals, Muxcntl, which determine the correct U and V chrominance value to choose for each pixel within a sequence of four pixels. FIG. 18 shows the timing sequence within the trans state machine 118.

A representative timing diagram of the interpolation process is shown in FIG. 19. With each rise of the UVclock signal, a set of U and V chrominance values is processed through the Interpolators 120 and 122. Entering the MUX 3by8 multiplexor 160 are the U and V chrominance values for the present sequence of four pixels, the previous sequence of four pixels and the interpolated values. These are represented in FIG. 19 by A, C and B respectively.

Inputted to the trans state machine 118 is the position code, Transl. In FIG. 19, the position code, Transl, for the first sequence of four pixels is 1. The trans state machine 118 outputs control signals, Muxcntl, corresponding to the inputted position code. Since the position code for the first sequence of four pixels is 1, the color transition occurs between the second and third pixels and the interpolated values for the U and V chrominances will be designated for the second pixel. Thus, the Muxontl signal will direct the MUX 3by8 multiplexor 160 to select the previous U and V chrominance value, C, for the first pixel, the interpolated U and V chrominance values, B, will be selected for the second pixel and the present U and V chrominance values, A, will be selected for pixels three and four.

Proceeding to the next rise of the UVclock signal in FIG. 19, the process is repeated for the corresponding sequence of four pixels. In this case the position code is 2 corresponding to a color transition occurring between the third and fourth pixels. Thus the trans state machine 118 will produce control signals, Muxontl, directing the MUX 3by8 multiplexor 160 to select the previous four-pixel group's U and V chrominance values, C, for pixels one and two; the interpolated U and V chrominance values, B, will be selected for the third pixel; and, the current U and V chrominance values, A, will be selected for the fourth pixel.

Proceeding to the third rise of the UVclook signal in FIG. 19, the process is again repeated for the corresponding sequence of four pixels wherein the position code, Transl, is a 3. Therefore, the color transition occurs at the boundary between the current sequence of four pixels and the next sequence of four pixels. The trans state machine 118 will produce Muxontl control signals directing the MUX 3by8 multiplexor 160 to select the U and V chrominance values, C, from the previous sequence of four pixels for the first, second and third pixels of the current sequence of four pixels, and the interpolated U and V chrominance values, B, will be selected for the fourth pixel.

If the position code for a sequence of four pixels is 0, corresponding to a color transition occurring between the first and second pixels, then the trans state machine 118 will direct the MUX 3by8 multiplexor 160 to select the interpolated U and V chrominance values, B, for the first pixel, and the current U and V chrominance values, A, will be selected for the second, third and fourth pixels in the current sequence of four pixels.

If desired, the interpolated values B, can be omitted from being selected by the MUX 3by8 multiplexor 160. In this case, the pixel which ordinarily would receive the interpolated U and V chrominance values, B, will receive the previous U and V chrominance values, C.

As previously described, the MUX 3by8 multiplexor 160 selects the U and V chrominance values for each pixel within a sequence of four pixels. More specifically, the MUX 3by8 multiplexor 160 within interpolator 120 selects the proper U chrominance values for each pixel, and the MUX 3by8 multiplexor 160 within interpolator 122 selects the proper V chrominance values for each pixel.

Referring to FIG. 11, the 8 bit Y luminance, 8 bit U chrominance and the 8 bit V chrominance data streams exit the Y delta decoder 112, interpolator 120 and interpolator 122 respectively. These three data streams, along with the Yclock and reset signals, are transmitted to the YUV-to-RGB converter 20 for conversion into red, blue and green components for each PEL. Referring to FIG. 20, the operation of the YUV-to-RGB converter 20 is further detailed. The 8 bit U chrominance data cycles through a timing latch 162 and into a ROM 164 which effectively performs a calculation on every 8 bit U chrominance value. The ROM 164 performs the following calculation on U: A=-(U128)*1.733. The results of these calculations are cycled through timing latch 166 into an ADD 2×8-no-overflow summation block 170, which adds each A to its corresponding 8 bit Y luminance value to produce the blue color component for each PEL. Effectively, the ADD 2×8-no-overflow summation block 170, which is further detailed in FIG. 22, performs the following calculation: BLUE=Y+A=Y+[-(U−128)*1.733]. In addition, the ADD 2×8-no-overflow summation block 170 detects overflow and underflow conditions within the resulting sum, BLUE, thereby ensuring that the sum, BLUE, does not exceed the range of 0 to 255. The resulting 9-bit summed value has its most significant bit, which is the sign designation and will always equal 0, dropped and then is cycled through timing latch 172 before exiting the YUV-to-RGB converter 20.

The incoming 8 bit V chrominance values are cycled through a timing latch 174 before entering a ROM 176 which performs the following calculation: A=(V−128)*1.371. The results pass through timing latch 178 before entering an ADD 2×8-no-overflow summation Block 180, which operates identically to the ADD 2×8-no-overflow summation block 170, where they are added to corresponding 8 bit Y luminance values to produce the Y+[(V−128)*1.371]. The most significant bit, which is the sign designation and will always equal 0, is dropped from the 9-bit result and subsequently cycled through timing latch 182 before exiting the YUV-to-RGB converter 20. To produce the green color component for each PEL, the 8 bit U and V chrominance components exiting from timing latches 162 and 174 respectively are also directed to ROM 184 and ROM 192 respectively. ROM 184 performs the following calculation on each 8 bit U chrominance value: A=−(U−128)*0.3366. ROM 192 performs the following calculation on each 8 bit V chrominance value: B=−(V−128)*0.6983. The results, A and B, are cycled through timing latches 186 and 194 respectively before entering an ADD 3×8-no-overflow summation block 188 where they are both subtracted from corresponding Y luminance values as such:

$$GREEN = Y - A - B = Y - (U - 128 * 0.3366) - [(V - 128) * 0.6983].$$

Figure 21:
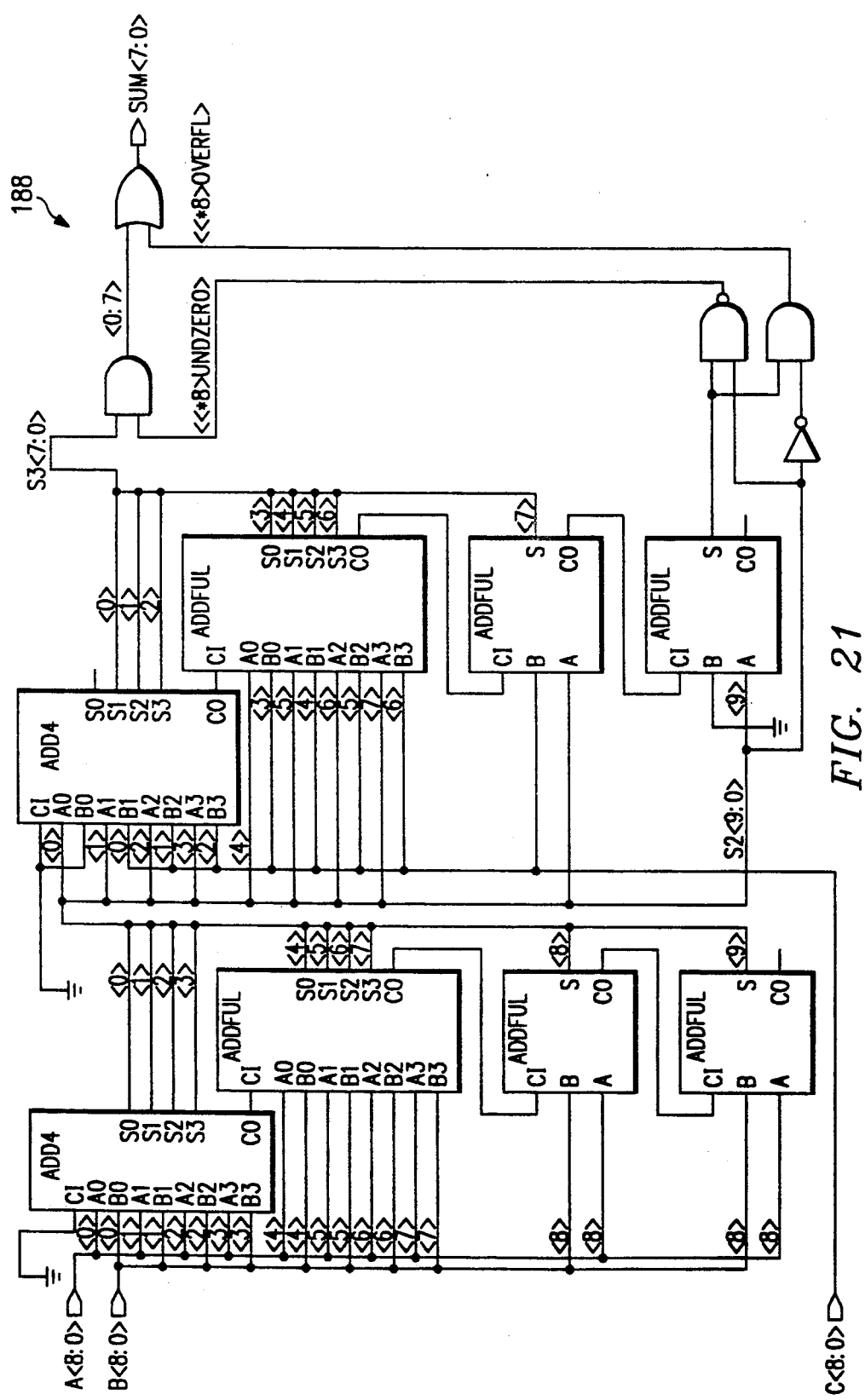
FIG. 21 is a schematic diagram of an add-3-by-8-no-overflow circuit utilized within the YUV-to-RGB converter of FIG. 20.
Figure 22:
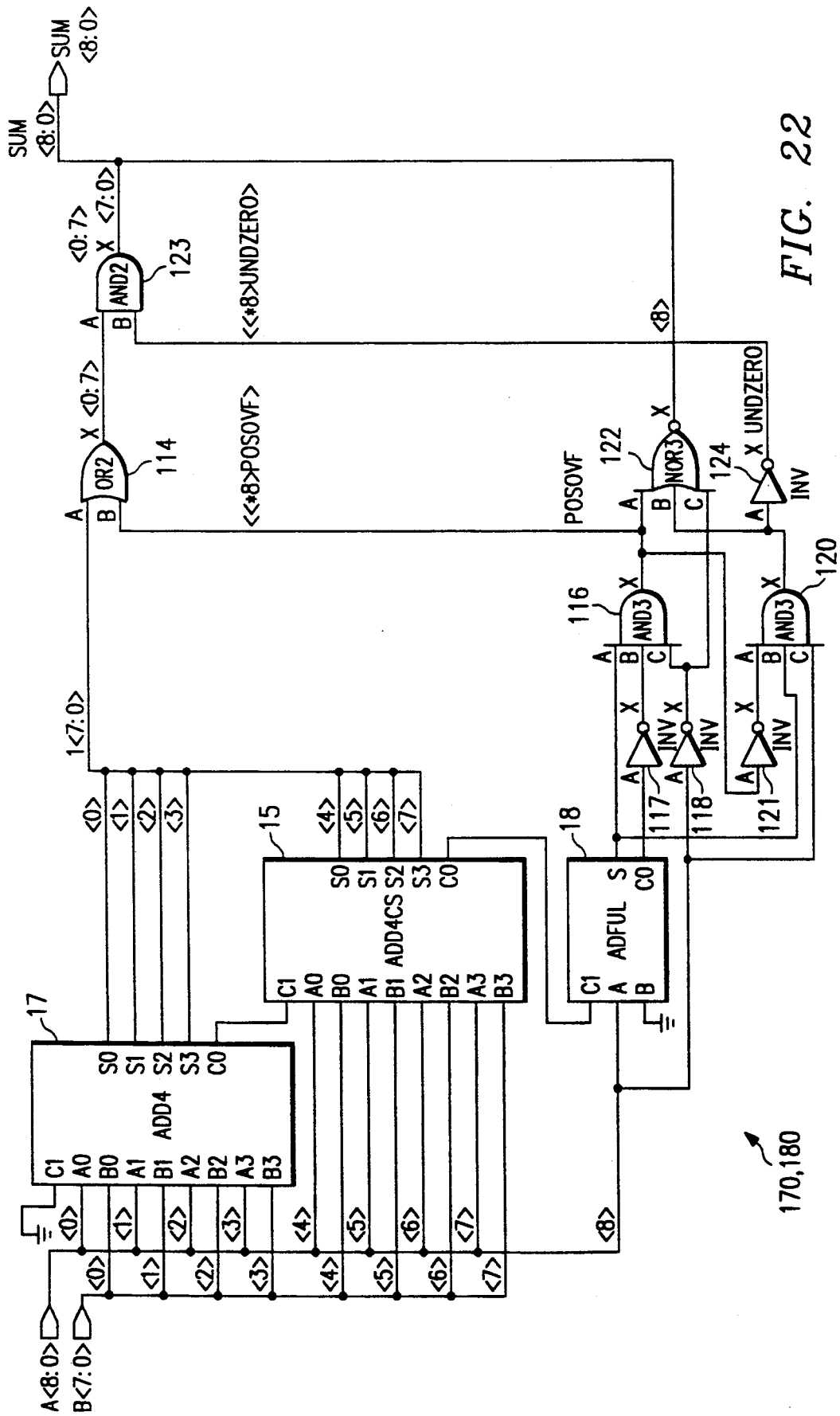
FIG. 22 is a schematic diagram of an add-2-by-8-no-overflow circuit utilized within the YUV-to-RGB converter of FIG. 20.

The ADD 3×8-no-overflow summation block is further detailed in FIG. 21. The resulting 8 bit GREEN components are cycled through a timing latch 190 before exiting the YUV-to-RGB converter 20.

Referring to FIG. 2, the 8 bit RED, BLUE and GREEN components for each PEL are then passed through multiplexor 28 and further transmitted to the digital-to-analog converter 12.

Thus, there has been described and illustrated herein a multiple mode operable for decoding video color data signals such as differentially encoded video signals. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation of the scope of the invention.

What is claimed is:

1. A method for decoding encoded video data comprising the steps of:
   deformatting encoded video data into a five bit luminance component for each of four successive pixel elements, a first five bit chrominance component for said four successive pixel elements and a second five bit chrominance component for said four successive pixel elements;
   differentially decompressing said five bit luminance component for each of said four successive pixel elements into an eight bit luminance component for said pixel element;
   differentially decompressing said first five bit chrominance component for said four successive pixel elements into a first eight bit chrominance component for said four successive pixel elements;
   differentially decompressing said second five bit chrominance component for said four successive pixel elements into a second eight bit chrominance component for said four successive pixel elements; and
   converting said differentially decompressed luminance and chrominance components into corresponding red, green and blue components.

2. A method for decoding encoded video data according to claim 1 and further comprising the steps of:
   determining the location of a color transition within said four successive pixel elements; and
   replacing said first eight bit chrominance component with an interpolated first eight bit chrominance component for said pixel element preceding said color transition.

3. A method for decoding encoded video data according to claim 2 and further comprising the step of replacing said second eight bit chrominance component with an interpolated second eight bit chrominance component for said pixel element preceding said color transition.

4. A method for decoding encoded video data according to claim 3 and further comprising the steps of:
   determining, from said first chrominance component for said four successive pixel elements and a first chrominance component for the previous four successive pixel elements, said interpolated first chrominance component; and
   determining, from said second chrominance component for said four successive pixel elements and a second chrominance component for the previous four successive pixel elements, said interpolated second chrominance component.

5. A method for decoding encoded video data according to claim 4 wherein the step of determining said interpolated first chrominance component further comprises the step of determining the average of said first chrominance component for said four successive pixel elements and said first chrominance component for the previous four successive pixel elements and the step of determining said interpolated second chrominance component further comprises the step of determining the average of said second chrominance component for said four successive pixel elements and said second chrominance component for the previous four successive pixel elements.

6. A method for decoding encoded video data according to claim 1 wherein the steps of differently decompressing five bit components into eight bit components further comprise the step of favoring smaller differential changes in said components during the differential decompression of said five bit components into eight bit components.

7. A method for decoding encoded video data according to claim 6 wherein said step of favoring smaller differential changes in said components during the differential decompression of said five bit components into said eight bit components further comprises the step of expanding said five bit components into said eight bit components according to the following relationships:

| 5 bit value | 8 bit value | 5 bit value | 8 bit value |
| --- | --- | --- | --- |
| 0 | 0 | 16 | 128 |
| 1 | 1 | 17 | 165 |
| 2 | 2 | 18 | 190 |
| 3 | 3 | 19 | 206 |
| 4 | 4 | 20 | 218 |
| 5 | 5 | 21 | 227 |
| 6 | 6 | 22 | 234 |
| 7 | 9 | 23 | 239 |
| 8 | 12 | 24 | 244 |
| 9 | 17 | 25 | 247 |
| 10 | 22 | 26 | 250 |
| 11 | 29 | 27 | 251 |
| 12 | 38 | 28 | 252 |
| 13 | 50 | 29 | 253 |
| 14 | 66 | 30 | 254 |
| 15 | 91 | 31 | 255 |

8. A method for decoding encoded video data according to claim 1 wherein the step of deformatting encoded video data into a five bit luminance component for each of four successive pixel elements, a first five bit chrominance component for said four successive pixel elements and a second five bit chrominance component for said four successive pixel elements further comprises the step of deformatting encoded video data into a two bit transitional code for said four successive pixel elements.

9. A method for decoding encoded video data according to claim 8 wherein the step of deformatting encoded video data into a five bit luminance component for each of four successive pixel elements, a first five bit chrominance component for said four successive pixel elements, a second five bit chrominance component for said four successive pixel elements, and a two bit transitional code further comprises the steps of:

extracting a five bit luminance component for a first one of said four successive pixel elements, two bits of a first five bit chrominance component for said four successive pixel elements and one bit of a two bit transitional code from a first byte of encoded video data;

extracting a five bit luminance component for a second one of said four successive pixel elements and three bits of said first five bit chrominance component of said four successive pixel elements from a second byte of encoded video data;

extracting a five bit luminance component for a third one of said four successive pixel elements, two bits of a second five bit chrominance component for said four successive pixel elements and one bit of said two bit transitional code from a third byte of encoded video data; and extracting a five bit luminance component for a fourth one of said four successive pixel elements and three bits of said second five bit chrominance component for said four successive pixel elements from a fourth byte of encoded video data.

10. A method for decoding encoded video data according to claim 9 and further comprising the steps of:

combining said extracted first, second, third and fourth five bit luminance components into a luminance component data stream;

combining said extracted bits of said first chrominance component into a first chrominance component data stream;

combining said extracted bits of said second chrominance component into a second chrominance component data stream; and combining said extracted bits of said transitional code into a transitional code data stream.

11. A method for decoding encoded video data according to claim 10 and further comprising the steps of:

determining the location of a color transition within said four successive pixel elements; and replacing said first eight bit chrominance component with an interpolated first eight bit chrominance component for said pixel element preceding said color transition.

12. A method for decoding encoded video data according to claim 11 and further comprising the step of determining, from the value of said two bit transitional code, the location within said four successive pixel elements of said color transition.

13. A method for decoding encoded video data according to claim 12 and further comprising the step of determining that said color transition is located between said first and second pixel elements if said transitional code has a value of 0, determining that said color transition is located between said second and third pixel elements if said transitional code has a value of 1, determining that said color transition is located between said third and fourth pixel elements if said transitional code has a value of 2 and determining that said color transition is located after said fourth pixel element if said transitional code has a value of 3.

14. A method for decoding encoded video data according to claim 13 and further comprising the step of replacing said second eight bit chrominance component with an interpolated second eight bit chrominance component for said pixel element preceding said color transition.

15. A method for decoding encoded video data according to claim 14 and further comprising the steps of:

determining, from said first chrominance component for said four successive pixel elements and a first chrominance component for the previous four successive pixel elements, said interpolated first chrominance component; and determining, from said second chrominance component for said four successive pixel elements and a second chrominance component for the previous four successive pixel elements, said interpolated second chrominance component.

16. A method for decoding encoded video data according to claim 15 wherein the step of determining said interpolated first chrominance component further comprises the step of determining the average of said first chrominance component for said four successive pixel elements and said first chrominance component for the previous four successive pixel elements and the step of determining said interpolated second chrominance component further comprises the step of determining the average of said second chrominance component for said four successive pixel elements and said second chrominance component for the previous four successive pixel elements.

17. A method for decoding encoded video data according to claim 16 wherein the steps of differentially decompressing five bit components into eight bit components further comprise the step of favoring smaller differential changes in said components during the differential decompression of said five bit components into eight bit components.

18. A method for decoding encoded video data according to claim 17 wherein said step of favoring smaller differential changes in said components during the differential decompression of said five bit components into said eight bit components further comprises the step of expanding said five bit components into said eight bit components according to the following relationships:

| 5 bit value | 8 bit value | 5 bit value | 8 bit value |
|---|---|---|---|
| 0 | 0 | 16 | 128 |
| 1 | 1 | 17 | 165 |
| 2 | 2 | 18 | 190 |
| 3 | 3 | 19 | 206 |
| 4 | 4 | 20 | 218 |
| 5 | 5 | 21 | 227 |
| 6 | 6 | 22 | 234 |
| 7 | 9 | 23 | 239 |
| 8 | 12 | 24 | 244 |
| 9 | 17 | 25 | 247 |
| 10 | 22 | 26 | 250 |
| 11 | 29 | 27 | 251 |
| 12 | 38 | 28 | 252 |
| 13 | 50 | 29 | 253 |
| 14 | 66 | 30 | 254 |
| 15 | 91 | 31 | 255 |

19. An apparatus for decoding encoded video data comprising:

means for deformatting encoded video data into a five bit luminance component for each of four successive pixel elements, a first five bit chrominance component for said four successive pixel elements and a second five bit chrominance component for said four successive pixel elements;

means for differentially decompressing said deformatted five bit components into eight bit components; and means for converting said differentially decompressed luminance and chrominance components into corresponding red, green and blue components.

20. An apparatus for decoding encoded video data according to claim 19 and further comprising:

means for determining the location of a color transition within said four successive pixel elements; and means for replacing said first and second eight bit chrominance components with interpolated first and eight bit chrominance components for said pixel element preceding said color transition.

21. An apparatus for decoding encoded video data according to claim 20 wherein said deformatter means further comprises means for deformatting encoded video data into a two bit transitional code for said four successive pixel elements.

22. An apparatus for decoding encoded video data according to claim 21 wherein said means for determining the location of a color transition within said four successive pixel elements further comprises a transition state machine connected to receive said two bit transitional code from said deformatter means, said transition state machine determining the location of said color transition from said received two bit transitional code.

23. An apparatus for decoding encoded video data according to claim 22 wherein said deformatting means further comprises means for extracting a five bit luminance component for a first one of said four successive pixel elements, two bits of a first five bit chrominance component for said four successive pixel elements and one bit of a two bit transitional code from a first byte of encoded video data, a five bit luminance component for a second one of said four successive pixel elements and three bits of said first five bit chrominance component for said four successive pixel elements from a second byte of encoded video data, a five bit luminance component for a third one of said four successive pixel elements, two bits of a second five bit chrominance component for said four successive pixel elements and one bit of said two bit transitional code from a third byte of encoded video data, and a five bit luminance component for a fourth one of said four successive pixel elements and three bits of said second five bit chrominance component for said four successive pixel elements from a fourth byte of encoded video data.

24. A method for decoding encoded video data into a plurality of RGB type pixel elements comprising the steps of:

deformatting encoded video data into a luminance component for each one of a first plurality of pixel elements, first and second chrominance components for said first plurality of pixel elements, and a transitional code indicative of a color transition within said first plurality of pixel elements;

decompressing said luminance component for each of said first plurality of pixel elements;

decompressing said first and second chrominance components for said plurality of pixel elements;

determining the location of a color transition within said first plurality of pixel elements based upon said transition code;

replacing said first and second decompressed chrominance components for selected ones of said first plurality of pixel elements with third and fourth decompressed chrominance components based upon the determined location of said color transition; and converting said decompressed luminance and said first and second decompressed chrominance components into RGB type pixel elements.

25. A method for decoding encoded video data according to claim 24 and further comprising the steps of:
   determining, from said first chrominance component for said first plurality of pixel elements and a first chrominance component for a second plurality of pixel elements, said third chrominance component; and
   determining, from said second chrominance component for said first plurality of pixel elements and a second chrominance component for said second plurality of pixel elements, said fourth chrominance component.

26. A method for decoding encoded video data according to claim 25 wherein said first and second plurality of pixel elements have equal numbers of pixel elements and wherein the step of determining said third chrominance component further comprises the step of determining the average of said first chrominance components for said first and second plurality of pixel elements and the step of determining said fourth chrominance component further comprises the step of determining the average of said second chrominance components for said first and second plurality of pixel elements.

27. A method for decoding encoded video data according to claim 24 wherein each of said luminance components further comprise a Y luminance component representing a single pixel element compressed at an 8:5 ratio and wherein the step of decompressing said luminance component for each of said first plurality of pixel elements further comprises the step of performing a 5:8 decompression of each of said luminance components.

28. A method for decoding encoded video data according to claim 27 wherein said first chrominance component further comprises a U chrominance component subsampled to represent four pixel elements and compressed at an 8:5 ratio and wherein the step of decompressing said first chrominance component for said first plurality of pixel elements further comprises the step of performing a 5:8 decompression of said first chrominance component.

29. A method for decoding encoded video data according to claim 28 wherein said second chrominance component further comprises a V chrominance component subsampled to represent four pixel elements and compressed at an 8:5 ratio and wherein the step of decompressing said second chrominance component for said first plurality of pixel elements further comprises the step of performing a 5:8 decompression of said second chrominance component.

* * * * *

UNITED STATES PATENT AND TRADEMARK OFFICE
CERTIFICATE OF CORRECTION

PATENT NO. : 5,220,410

DATED : June 15, 1993

INVENTOR(S) : Carl K. Wakeland and Dale Chatham

It is certified that error appears in the above-identified patent and that said Letters Patent is hereby corrected as shown below:

Column 1, line 55, insert a tab before "The CD" to indicate a new paragraph.

Column 5, lines 16-17, change "system 4" to --system 2--.

Column 6, line 14, change "audio" to --analog--.

Column 6, line 54, change "pal®the" to --palette--.

Column 7, line 24, change "Ø" to --0--.

Column 7, line 51, insert a new line and a tab before "Referring" to indicate a new paragraph.

Column 9, line 21, insert a new line and a tab before "In FIG. 7," to indicate a new paragraph.

Column 9, line 68, change "ode" to --code--.

Column 10, line 3, change "One" to --one--.

Column 12, line 16, change "IØ" to --I0--.

Column 12, line 53, change "deference" to --difference--.

Column 13, line 49, change "Muxont1" to --Muxcnt1--.

Column 13, line 50, change "Muxont1" to --Muxcnt1--.

Column 14, line 5, change "Muxont1" to --Muxcnt1--.

Column 14, line 21, change "Muxont1" to --Muxcnt1--.

Column 14, line 27, change "Muxont1" to --Muxcnt1--.

Column 14, line 38, change "Muxont1" to --Muxcnt1--.

Column 14, line 51, change "Muxont1'" to --Muxcnt1--.

Column 14, lines 1-2, change "machine 118" to --state machine 118--.

UNITED STATES PATENT AND TRADEMARK OFFICE
CERTIFICATE OF CORRECTION

PATENT NO. : 5,220,410
DATED : June 15, 1993
INVENTOR(S) : Carl K. Wakeland and Dale Chatham It is certified that error appears in the above-identified patent and that said Letters Patent is hereby corrected as shown below:

Column 15, lines 17-18, insert a new line and a tab before "Referring to FIG. 20" to indicate a new paragraph.

Column 15, line 24, change "U128" to --U-128--.

Column 15, line 49, change "Y+" to --red color component for each PEL as such: RED = Y+A = Y+ --.

Column 15, line 53, insert a new line and a tab before "To produce" to indicate a new paragraph.

<u>In the Claims</u>:

Column 17, line 18, change "differently" to --differentially--.

Signed and Sealed this

Fifth Day of July, 1994

*Attest:*

BRUCE LEHMAN

*Attesting Officer*     *Commissioner of Patents and Trademarks*